(12) United States Patent
Choksi et al.

(10) Patent No.: US 8,989,691 B2
(45) Date of Patent: Mar. 24, 2015

(54) IMPEDANCE BALANCING FOR POWER SUPPLY REJECTION IN SINGLE-ENDED RECEIVERS

(71) Applicant: QUALCOMM Incorporated, San Diego, CA (US)

(72) Inventors: Ojas M Choksi, San Diego, CA (US); Wei Zhuo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 13/692,883

(22) Filed: Dec. 3, 2012

(65) Prior Publication Data

US 2013/0281041 A1    Oct. 24, 2013

Related U.S. Application Data

(60) Provisional application No. 61/635,535, filed on Apr. 19, 2012.

(51) Int. Cl.
| | | |
|---|---|---|
| *H04B 1/10* | (2006.01) | |
| *H04B 1/12* | (2006.01) | |
| *H04B 1/18* | (2006.01) | |

(52) U.S. Cl.
CPC ... *H04B 1/12* (2013.01); *H04B 1/18* (2013.01)
USPC ........... 455/298; 455/323; 455/334; 455/133; 375/258

(58) Field of Classification Search
USPC ......... 455/132, 133, 296, 298, 313, 323, 334, 455/338–340; 375/258, 318
See application file for complete search history.

(56) References Cited

U.S. PATENT DOCUMENTS

| | | | |
|---|---|---|---|
| 6,275,687 | B1 | 8/2001 | Lloyd |
| 7,453,943 | B2 | 11/2008 | Kuo et al. |
| 7,526,256 | B2 | 4/2009 | Bhatti et al. |
| 7,728,661 | B2 * | 6/2010 | Bockelman et al. ............ 330/51 |
| 7,761,078 | B2 | 7/2010 | Bhagat et al. |
| 7,769,360 | B2 | 8/2010 | Chen et al. |
| 8,044,540 | B2 | 10/2011 | Lee et al. |
| 8,270,499 | B2 * | 9/2012 | Chang et al. .................. 375/258 |
| 2008/0139149 | A1 | 6/2008 | Mu et al. |
| 2010/0197244 | A1 | 8/2010 | Gomez et al. |
| 2011/0110463 | A1 | 5/2011 | Chang et al. |
| 2011/0299433 | A1 | 12/2011 | Darabi |

FOREIGN PATENT DOCUMENTS

WO    03077418 A1    9/2003

OTHER PUBLICATIONS

International Search Report and Written Opinion—PCT/US2013/037449—ISA/EPO—Jun. 20, 2013.

* cited by examiner

*Primary Examiner* — Nhan Le

(57) ABSTRACT

Power supply rejection in a single-ended receiver, through impedance balancing, is described. The single-ended receiver includes a first low noise amplifier and a second low noise amplifier. The single-ended receiver also includes a multi-port coupled transformer that outputs a differential signal. The multi-port coupled transformer includes a first primary coil that is coupled to an output of the first low noise amplifier and a second primary coil. The single-ended receiver also includes balancing impedances at the output of each of the low noise amplifiers. These impedances can be configured such that the on impedance of the first low noise amplifier equals the combined impedance of the off impedance of the second low noise amplifier and the balancing impedance. This balancing of impedances on the first and second primary coils results in power supply rejection of noise and spurious signals.

17 Claims, 13 Drawing Sheets

IMPEDANCE BALANCING FOR POWER SUPPLY REJECTION IN SINGLE-ENDED RECEIVERS

CLAIM OF PRIORITY UNDER 35 U.S.C. §119

The present application for patent claims priority to Provisional Application No. 61/635,535, entitled "A RF POWER SUPPLY REJECTION TECHNIQUE FOR SINGLE-ENDED MULTI-MODE MULTI-BAND RECEIVERS" filed Apr. 19, 2012, and assigned to the assignee hereof and hereby expressly incorporated by reference herein.

TECHNICAL FIELD

The present disclosure relates generally to electronic devices for communication systems. More specifically, the present disclosure relates to systems and methods for impedance balancing for power supply rejection in single-ended receivers.

BACKGROUND

Wireless communication systems are widely deployed to provide various types of communication content such as voice, video, data, and so on. These systems may be multiple-access systems capable of supporting simultaneous communication of multiple terminals with one or more base stations.

A terminal or a base station may include one or more integrated circuits. These integrated circuits may include analog and digital circuitry necessary for wireless communication. Such circuitry may include inductors. As the technology used to build integrated circuits progresses, some elements on the integrated circuit such as transistors continue to decrease in size. However, some elements, such as passive elements, have not decreased in size as quickly. Therefore, benefits may be realized by simplifying an integrated circuit.

SUMMARY OF THE INVENTION

A single-ended receiver for power supply rejection is described. The single-ended receiver includes a first low noise amplifier. The single-ended receiver also includes a second low noise amplifier. The single-ended receiver further includes a balancing impedance. The single-ended receiver also includes a multi-port coupled transformer that outputs a differential signal. The multi-port coupled transformer includes a first primary coil that is coupled to an output of the first low noise amplifier. The multi-port coupled transformer also includes a second primary coil. The first primary coil and the second primary coil are tightly coupled as a differential inductor.

The second primary coil may be coupled to an output of the second low noise amplifier. The first low noise amplifier may receive a first input signal. The second low noise amplifier may receive a second input signal. When the first input signal is active and the second input signal is inactive, the multi-port coupled transformer may output the differential signal based on the first input signal. When the first input signal is inactive and the second input signal is active, the multi-port coupled transformer may output the differential signal based on the second input signal.

The first input signal may be in a first frequency band and the second input signal may be in a second frequency band. The first low noise amplifier may be a high-band low noise amplifier. The second low noise amplifier may be a low-band low noise amplifier. The multi-port coupled transformer may also include a first secondary coil. The first secondary coil may be coupled between a first input of a first mixer and a second input of the first mixer. A first coupling may occur between the first primary coil and the first secondary coil. The first primary coil may be coupled to the second primary coil. The first mixer may be a shared mixer. A second coupling may occur between the second primary coil and the first secondary coil.

The balancing impedance may include a first balancing impedance coupled to the output of the first low noise amplifier via a first switch and to ground. An off impedance of the second low noise amplifier combined with the first balancing impedance may equal an on impedance of the first low noise amplifier. A second balancing impedance may be coupled to the output of the second low noise amplifier via a second switch and to ground. An off impedance of the first low noise amplifier combined with the second balancing impedance may equal an on impedance of the second low noise amplifier.

The single-ended receiver may include a first extended primary coil coupled to the first primary coil. The single-ended receiver may also include a second extended primary coil coupled to the second primary coil. The balancing impedance may include a first balancing impedance coupled between the first extended primary coil and ground. The balancing impedance may also include a second balancing impedance coupled between the second extended primary coil and ground. The multi-port coupled transformer may also include a second secondary coil. The single-ended receiver may include a second mixer. The second secondary coil may be coupled between a first input of the second mixer and a second input of the second mixer. The multi-port coupled transformer may also include a second secondary coil that is coupled between the first input of the first mixer and the second input of the first mixer.

The balancing impedance may include a first balancing impedance coupled to the output of the first low noise amplifier via a first switch and to ground. The balancing impedance may also include a second balancing impedance coupled to the output of the second low noise amplifier via a second switch and to ground. The balancing impedance may include a third balancing impedance coupled to the output of the first low noise amplifier via a third switch and to ground. The balancing impedance may also include a fourth balancing impedance coupled to the output of the second low noise amplifier via a fourth switch and to ground.

An output of the first low noise amplifier may be coupled to an output of the second low noise amplifier. The multi-port coupled transformer may include a first secondary coil that is coupled between a first input of a first mixer and a second input of the first mixer. A first coupling may occur between the first primary coil and the first secondary coil. A second coupling may occur between the second primary coil and the second secondary coil. The balancing impedance may include a first balancing impedance coupled to the output of the first low noise amplifier via a first switch and to ground. The balancing impedance may also include a second balancing impedance coupled to the output of the second low noise amplifier via a second switch and to ground. The balancing impedance may further include a third balancing impedance coupled to the second primary coil via a third switch and to ground. The balancing impedance may also include a fourth balancing impedance coupled to the second primary coil via a fourth switch and to ground.

The second primary coil may be coupled to an output of the second low noise amplifier. The balancing impedance may include a first balancing impedance coupled to the output of the first low noise amplifier via a first switch and to ground.

The balancing impedance may also include a second balancing impedance coupled to the output of the second low noise amplifier via a second switch and to ground. The single-ended receiver may also include a mixer. A first input of the mixer may be coupled to the output of the first low noise amplifier. A second input of the mixer may be coupled to the output of the second low noise amplifier.

A method for receiving a wireless signal is also described. A first input signal is obtained. A second input signal is also obtained. The first input signal and the second input signal are provided to a multi-port coupled transformer that is coupled to a balancing impedance. A differential signal is obtained from the multi-port coupled transformer.

The first input signal may be amplified using a first low noise amplifier. The second input signal may be amplified using a second low noise amplifier.

An apparatus for receiving a wireless signal is described. The apparatus includes means for obtaining a first input signal. The apparatus also includes means for obtaining a second input signal. The apparatus further includes means for providing the first input signal and the second input signal to a multi-port coupled transformer that is coupled to a balancing impedance. The apparatus also includes means for obtaining a differential signal from the multi-port coupled transformer.

A computer-program product for receiving a wireless signal is also described. The computer-program product includes a non-transitory computer-readable medium having instructions thereon. The instructions include code for causing a wireless device to obtain a first input signal. The instructions also include code for causing the wireless device to obtain a second input signal. The instructions further include code for causing the wireless device to provide the first input signal and the second input signal to a multi-port coupled transformer that is coupled to a balancing impedance. The instructions also include code for causing the wireless device to obtain a differential signal from the multi-port coupled transformer.

DETAILED DESCRIPTION

Figure 1:
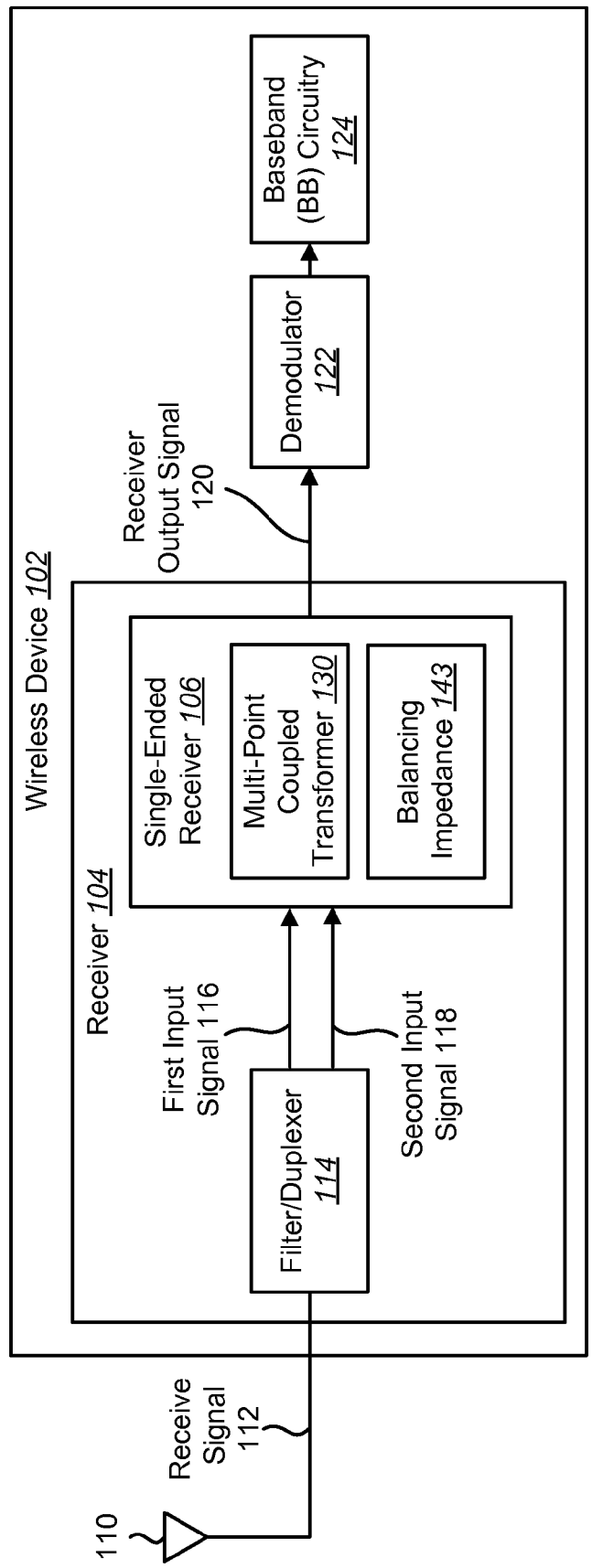
FIG. 1 is a block diagram illustrating a wireless device that uses a single-ended receiver.

FIG. 1 is a block diagram illustrating a wireless device 102 that uses a single-ended receiver 106. The wireless device 102 may be a wireless communication device or a base station. The single-ended receiver 106 may be used to combine multiple signal paths, thereby reducing the number of input pins/balls, the die area and the power consumption of a wireless device 102.

A wireless communication device may also be referred to as, and may include some or all of the functionality of, a terminal, an access terminal, a user equipment (UE), a subscriber unit, a station, etc. A wireless communication device may be a cellular phone, a personal digital assistant (PDA), a wireless device, a wireless modem, a handheld device, a laptop computer, a PC card, compact flash, an external or internal modem, a wireline phone, etc. A wireless communication device may be mobile or stationary. A wireless communication device may communicate with zero, one or multiple base stations on a downlink and/or an uplink at any given moment. The downlink (or forward link) refers to the communication link from a base station to a wireless communication device, and the uplink (or reverse link) refers to the communication link from a wireless communication device to a base station. Uplink and downlink may refer to the communication link or to the carriers used for the communication link.

A wireless communication device may operate in a wireless communication system that includes other wireless devices 102, such as base stations. A base station is a station that communicates with one or more wireless communication devices. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices. The term "cell" can refer to a base station and/or its coverage area, depending on the context in which the term is used.

Communications in a wireless communication system (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system may utilize both single-input and multiple-output (SIMO) and multiple-input and multiple-output (MIMO). The wireless communication system may be a multiple-access system capable of supporting communication with multiple wireless communication devices by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3rd Generation Partnership Project (3GPP) Long Term Evolution (LTE) systems and spatial division multiple access (SDMA) systems.

The wireless device 102 may include a receiver 104, a demodulator 122 and baseband (BB) circuitry 124. The receiver 104 may include a filter/duplexer 114. The filter/duplexer 114 may be a surface acoustic wave (SAW) filter/duplexer 114. The filter/duplexer 114 may receive a receive signal 112 from an antenna 110. The receive signal 112 may be a wireless signal. The filter/duplexer 114 may process and output the receive signal 112 as a first input signal 116 and a second input signal 118. In one configuration, the filter/duplexer 114 may produce the first input signal 116 and the second input signal 118 based on the frequency of the receive signal 112. For example, the filter/duplexer 114 may process and output incoming frequencies under 1 gigahertz (GHz) as the first input signal 116 and incoming frequencies over 1 GHz as the second input signal 118. Bands with frequencies less than 1 GHz may be referred to as low band (LB). Bands with frequencies greater than 1 GHz may be referred to as high band (HB).

The first input signal 116 may be a low-band (LB) signal and the second input signal 118 may be a high-band (HB) signal. In some configurations, the filter/duplexer 114 may process and output a number of input signals. For example, the filter/duplexer 114 may output up to six signals.

A receiver 104 may use a differential receiver design or a single-ended receiver 106 design. Differential receivers may offer excellent immunity to power supply noise, ground noise and common-mode spurs, at the expense of high power consumption, die area and pin count. In contrast, a single-ended receiver 106 may reduce the number of input pins, reduce the die area required and reduce the power consumption, at the expense of high sensitivity to power supply/ground noise and spurious common-mode signals. Thus, benefits may be realized by improvements to single-ended receivers 106.

The single-ended receiver 106 may receive the first input single 116 and/or the second input signal 118 from the filter/duplexer 114. As a result, the single-ended receiver 106 is not required to receive a differential signal. The single-ended receiver 106 may operate using a single signal front-end. In other words, only a single input signal is required for the single-ended receiver 106. This is in contrast to a differential front-end, which requires multiple input signals to operate.

One benefit of using a single-ended receiver 106 is that the amount of circuit components may be reduced. For example, only one input pin is required for a single-ended receiver 106. In contrast, two input pins are required for a differential receiver to operate. Thus, the number of input pins required is reduced when the receiver 104 includes a single-ended receiver 106.

A receiver that has less components may consume a smaller die/chip area. Additionally, using fewer components requires less power consumption by the wireless device 102. Thus, the use of a single-ended receiver 106 in a receiver 104 instead of a differential-ended receiver may reduce the power consumption of a wireless device 102.

The single-ended receiver 106 may include a multi-port coupled transformer 130. The multi-port coupled transformer 130 may increase the power supply rejection, reducing the sensitivity of the receiver to power supply noise and spurious common-mode signals. In one configuration, the multi-port coupled transformer 130 may provide more than 50 decibels (dB) more power supply rejection as compared to other transformers in single-ended receivers 106, without requiring external filtering components (which would increase the cost of the wireless device 102). To further improve the power supply rejection, the single-ended receiver 106 may also include one or more balancing impedances 143. The one or more balancing impedances 143 are discussed in additional detail below in relation to FIGS. 5-10.

The single-ended receiver 106 may provide a receiver output signal 120 to the demodulator 122. The demodulator 122 may provide a demodulated signal to the baseband (BB) circuitry 124. The baseband (BB) circuitry 124 may further process the demodulated signal. For example, the baseband (BB) circuitry 124 may further condition the demodulated signal to obtain voice and/or data.

In some configurations of a receiver 104, separate transformers and mixers are used for the highband path and the lowband path. This has a heavy area and current penalty. In other words, for two received signals, two sets of transformers and mixers are required. Thus, as the number of input signals increases, the number of transformers and mixers in the receiver 104 also increases. This then results in an increase in die/chip area and an increase in the amount of current required. Another technique is to use separate transformers for the highband path and the lowband path but to share a mixer. This saves some area but still has a large area penalty and loading issues.

In another configuration of a receiver 104, switches may be employed to switch transformers from processing the first input signal 116 to the second input signal 118. However, this type of configuration degrades the quality factor (Q) of the transformer and hence, degrades the signal-to-noise ratio (SNR). Further, this type of configuration also requires that multiple transformers be used.

Figure 2:
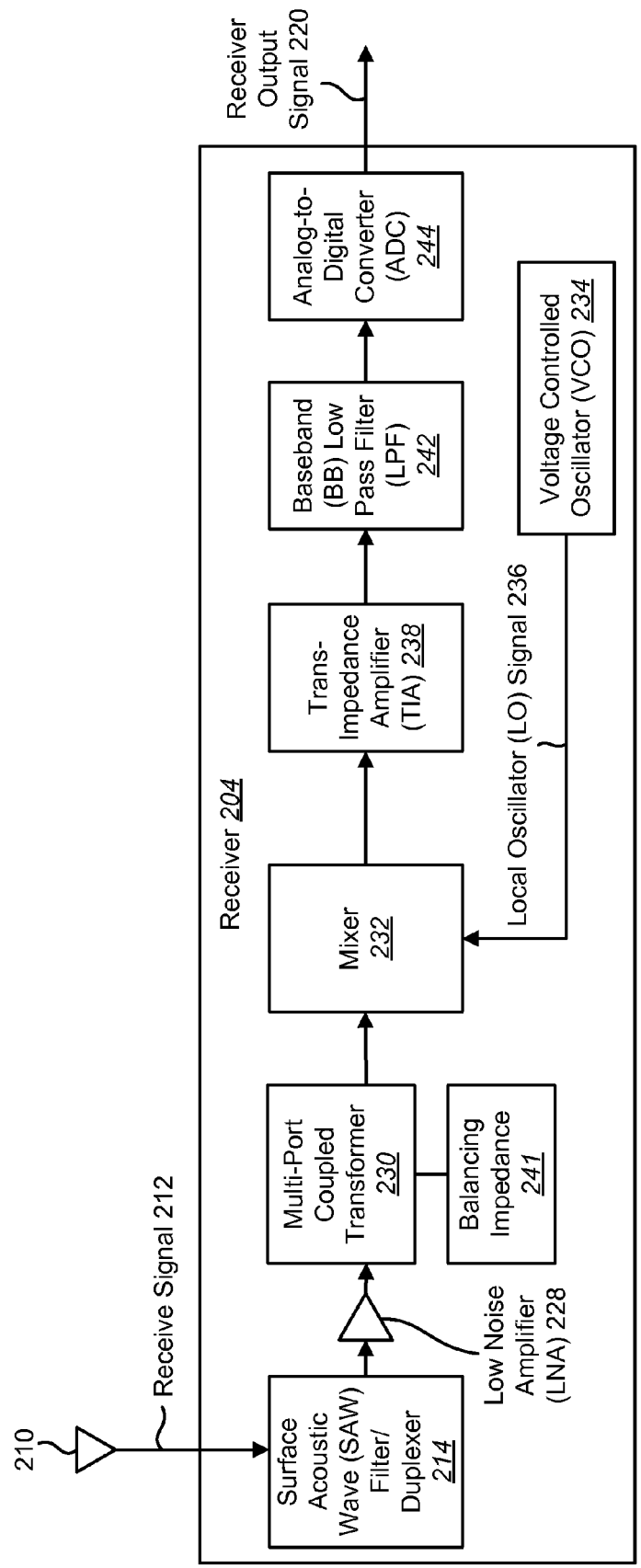
FIG. 2 is a block diagram illustrating one configuration of a receiver for use in the present systems and methods.

FIG. 2 is a block diagram illustrating one configuration of a receiver 204 for use in the present systems and methods. The receiver 204 of FIG. 2 may illustrate one configuration of the receiver 104 described in connection with FIG. 1. The receiver 204 may include a surface acoustic wave (SAW) filter/duplexer 214, a low noise amplifier (LNA) 228, a multi-port coupled transformer 230, a mixer 232, a trans-impedance amplifier (TIA) 238, a baseband (BB) low pass filter (LPF) 242, an analog-to-digital converter (ADC) 244 and a voltage controlled oscillator (VCO) 234.

The receiver 204 may obtain a receive signal 212 using an antenna 210. The receive signal 212 may include signals in one or more frequency bands. The receive signal 212 may be passed through the surface acoustic wave (SAW) filter/duplexer 214 and the low noise amplifier (LNA) 228. In one configuration, the low noise amplifier (LNA) 228 may be a single-ended low noise amplifier (LNA) 228. A single-ended low noise amplifier (LNA) 228 may be susceptible to sensitivity degradation due to spur or power management integrated circuit (PMIC) noise at RF frequencies (e.g., the local oscillator (LO) frequency harmonics such as $3^{rd}$, $5^{th}$, etc.) and noise at the duplex frequency (45 MHz, 80 MHz, 190 MHz, 400 MHz) in the presence of a strong jammer.

The power supply noise from the power management integrated circuit (PMIC) source is typically low-pass filtered to obtain rejection at RF frequencies. This comes at the expense of increased die area or increased bill of material (BOM) costs. Furthermore, the power supply network/grid may have resonances at high frequencies, which can increase the power management integrated circuit (PMIC) noise. The discrete components and the power management integrated circuit (PMIC) source may be poorly modeled at RF frequencies, making the single-ended receiver 106 more vulnerable to noise/sensitivity degradation at RF frequencies due to uncertainty in the frequency response.

The amplified signal may then be passed through the multi-port coupled transformer 230 to the mixer 232. In one configuration, a balancing impedance 241 may be coupled to the multi-port coupled transformer 230. The use of the multi-port coupled transformer 230 and the balancing impedance 241 may increase the power supply rejection of the single-ended receiver 106. The mixer 232 may adjust the frequency of the receive signal 212. The mixer 232 may receive a local oscillator (LO) signal 236 from a voltage controlled oscillator (VCO) 234. In one configuration, the mixer 232 may be a shared mixer 232. The output of the mixer 232 may be passed through the trans-impedance amplifier (TIA) 238, the baseband (BB) low pass filter (LPF) 242 and the analog-to-digital converter (ADC) 244 to obtain a receiver output signal 220.

Figure 3:
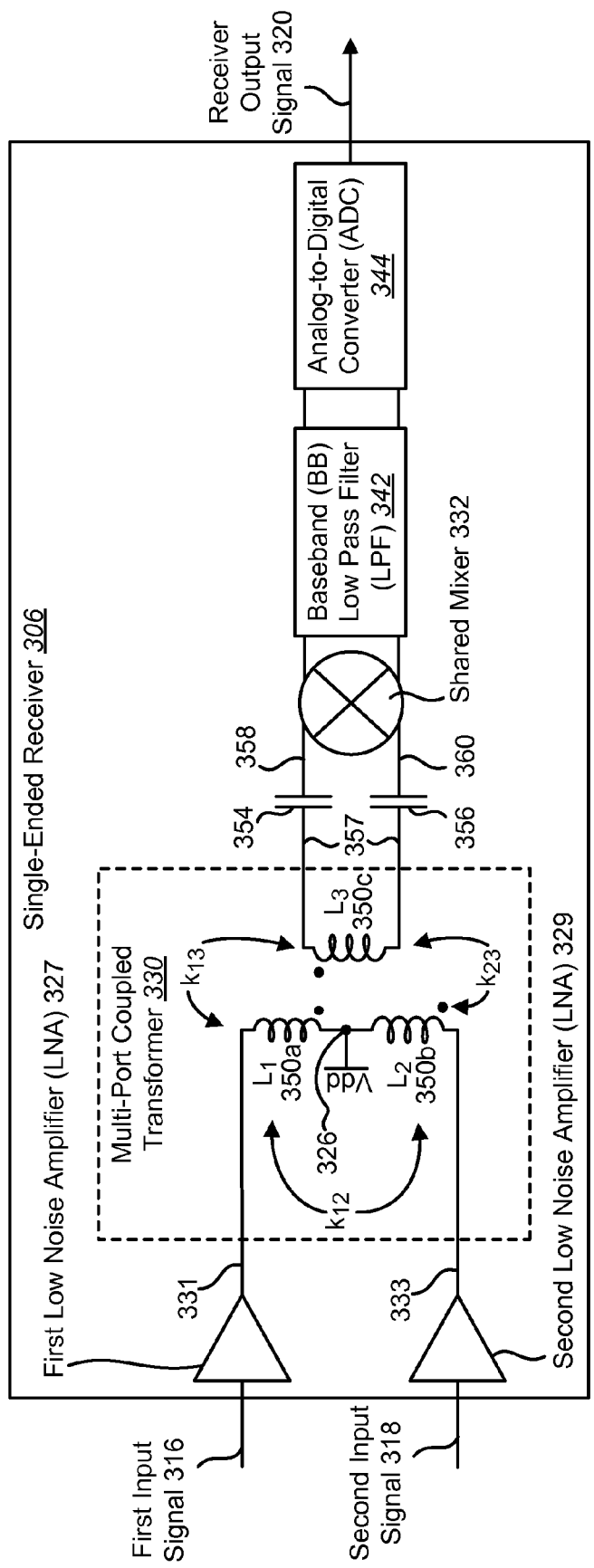
FIG. 3 is a block diagram illustrating one configuration of a single-ended receiver.

FIG. 3 is a block diagram illustrating one configuration of a single-ended receiver 306. The single-ended receiver 306 of FIG. 3 may illustrate one configuration of the single-ended receiver 106 described in connection with FIG. 1. The single-ended receiver 306 may include a multi-port coupled transformer 330, a shared mixer 332, a baseband (BB) low pass filter (LPF) 342 and an analog-to-digital converter (ADC) 344. For simplicity, the single-ended receiver 306 is illustrated with only one channel. However, the channel may include an inphase portion and a quadrature portion and the channel may be either single-ended or differential.

The single-ended receiver 306 uses a multi-port coupled transformer 330 to provide a differential signal 357 to the shared mixer 332. In one configuration, a low-band (LB) path and a high-band (HB) path may share the multi-port coupled transformer 330 and the shared mixer 332. Thus, in this configuration, the number of circuit elements needed to process a receive signal 112 is reduced while avoiding channel degradation. As a result, signal routing is simplified and current consumption in the single-ended receiver 306 is reduced. Further, a smaller die/chip size is required and less power is consumed.

Reducing the number of inductors may be especially helpful in reducing the die/chip size. While active circuit components decrease in size due to the advancement of the technology, the size of passive devices, such as inductors, do not shrink much. Thus, inductors may dominate the die/chip area used. Reducing the number of necessary inductors in an integrated circuit may have a greater effect in reducing the die/chip area than reducing the number of other circuit elements on a receiver 104.

The single-ended receiver 306 may receive a first input signal 316 and a second input signal 318. The first input signal 316 may be provided to a first low noise amplifier (LNA) 327. The second input signal 318 may be provided to a second low noise amplifier (LNA) 329. The first low noise amplifier (LNA) 327 and the second low noise amplifier (LNA) 329 of FIG. 3 may be one configuration of the low noise amplifier (LNA) 228 discussed in connection with FIG. 2. The first low noise amplifier (LNA) 327 and the second low noise amplifier (LNA) 329 may amplify different bands. For example, the first low noise amplifier (LNA) 327 may serve as a low-band (LB) low noise amplifier (LNA) 228 and the second low noise amplifier (LNA) 329 may serve as a high-band (HB) low noise amplifier (LNA) 228. In this example, the low-band (LB) may be the 800 megahertz (MHz) frequency band and the high-band (HB) may be the 1.99 GHz frequency band. In some configurations, additional low noise amplifiers (LNA) 228 may be employed to receive additional input signals and/or provide additional amplified input signals to the multi-port coupled transformer 330.

The first low noise amplifier (LNA) 327 may output a first amplified input signal 331. The second low noise amplifier (LNA) 329 may output a second amplified input signal 333. Both the first amplified input signal 331 and the second amplified input signal 333 may be provided to the multi-port coupled transformer 330. The multi-port coupled transformer 330 may include a first primary coil (i.e., inductor) L1 350a, a second primary coil L2 350b and a secondary coil L3 350c. The multi-port coupled transformer 330 may also include a center tap 326 that is between the first primary coil L1 350a and the second primary coil L2 350b. The center tap 326 may be coupled to a voltage supply (Vdd).

A first coupling may occur between the first primary coil L1 350a and the second primary coil L2 350b. The first coupling may have a coupling coefficient of k12. The first coupling may be such that the first primary coil L1 350a and the second primary coil L2 350b are tightly coupled as a differential inductor. One example of a layout where the first primary coil L1 350a and the second primary coil L2 350b are tightly coupled as a differential inductor is given in FIG. 11. The tight coupling between the first primary coil L1 350a and the second primary coil L2 350b may result in a large power supply rejection. By using a tight coupling between the first primary coil L1 350a and the second primary coil L2 350b, the power supply rejection ratio (PSRR) may be improved. In one configuration, the inductance of the first primary coil L1 350a may be the same as that of the second primary coil L2 350b.

A second coupling may occur between the first primary coil L1 350a and the secondary coil L3 350c. The second coupling may have a coupling coefficient of k13. A third coupling may occur between the second primary coil L2 350b and the secondary coil L3 350c. The third coupling may have a coupling coefficient of k23. In other words, the mutually coupled coils/inductors L1 350a, L2 350b and L3 350c may couple each other (with coupling coefficients k12, k13 and k23). The technique assumes that some current flows through the second primary coil L2 350b when the first low noise amplifier (LNA) 327 is operating and the second low noise amplifier (LNA) 329 is off. Similarly, this technique assumes that some current flows through the first primary coil L1 350a when the second low noise amplifier (LNA) 329 is operating and the first low noise amplifier (LNA) 327 is off.

The output of the first low noise amplifier (LNA) 327 may be coupled to the first primary coil L1 350a. The output of the second low noise amplifier (LNA) 329 may be coupled to the second primary coil L2 350b. The secondary coil L3 350c may be coupled between a first input 358 of the shared mixer 332 and a second input 360 of the shared mixer 332.

In one configuration, either the first input signal 316 or the second input signal 318 is active. If the first input signal 316 is active (and thus the second input signal 318 is inactive), the multi-port coupled transformer 330 may provide a differential signal 357 of the first input signal 316 to the shared mixer 332. Likewise, if the second input signal 318 is active (and thus the first input signal 316 is inactive), the multi-port coupled transformer 330 may provide a differential signal 357 of the second input signal 318 to the shared mixer 332.

As a result of the multi-port coupled transformer 330, only a single shared mixer 332 is required in the single-ended receiver 306 to process both the first input signal 316 and the second input signal 318. As an additional benefit, channel degradation may be reduced and in some cases, eliminated.

Furthermore, the single-ended receiver 306 may operate without the use of switches to switch transformers on or off. Because the number of required components is reduced, the single-ended receiver 306 may occupy less die area/printed circuit board area than a differential receiver.

In one configuration, a first capacitor 354 may be coupled between the secondary coil L3 350c and the first input 358 of the shared mixer 332. Likewise, a second capacitor 356 may be coupled between the secondary coil L3 350c and the second input 360 of the shared mixer 332. In another configuration, the capacitors 354, 356 may be removed and the secondary coil 350c may be directly coupled to the shared mixer 332.

The shared mixer 332 may process the differential signal 357. The shared mixer 332 may provide the processed signals to a baseband (BB) low pass filter (LPF) 342 and an analog-to-digital converter (ADC) 344. The analog-to-digital converter (ADC) 344 may provide at least one receiver output signal 320, which may be either single-ended or differential. In one configuration, multiple low noise amplifiers (LNAs) (not shown) may be connected in parallel at the output of the first low noise amplifier (LNA) 327 and the output of the second low noise amplifier (LNA) 329, respectively.

Figure 4:
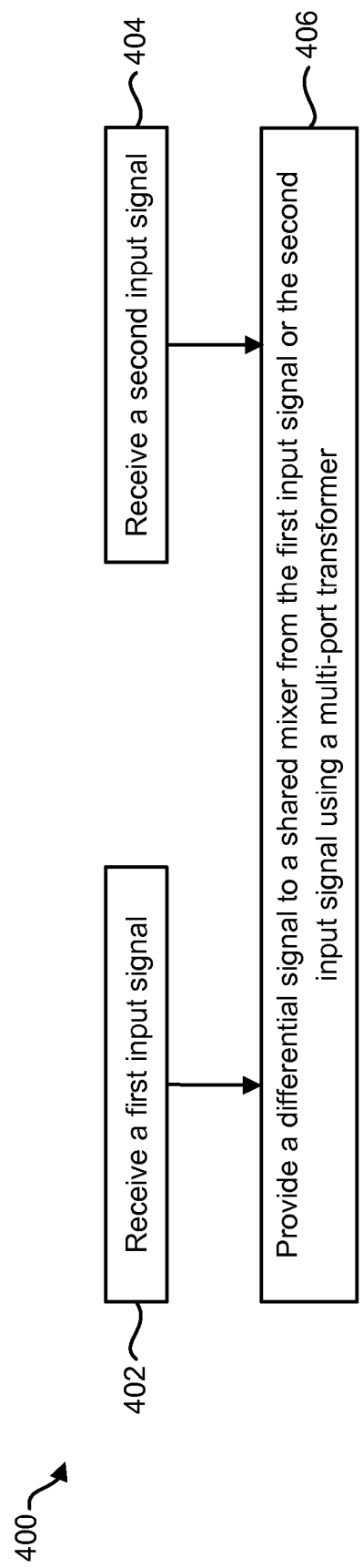
FIG. 4 is a flow diagram of a method for receiving a wireless signal using a single-ended receiver.

FIG. 4 is a flow diagram of a method 400 for receiving a wireless signal using a single-ended receiver 106. The method 400 may be performed by a wireless device 102. In one configuration, the method 400 may be performed by a single-ended receiver 106 on the wireless device 102. The single-ended receiver 106 may receive 402 a first input signal 116. The single-ended receiver 106 may also receive 404 a second input signal 118. The first input signal 116 and the second input signal 118 may or may not be received simultaneously. The single-ended receiver 106 may provide 406 a differential signal 357 to a shared mixer 332 from the first input signal 116 or the second input signal 118 using a multi-port coupled transformer 230.

For example, the multi-port coupled transformer 230 may use the first primary coil L1 350a coupled to the secondary coil L3 350c to provide a differential signal 357 from the first input signal 116 to the shared mixer 232. Likewise, the multi-port coupled transformer 230 may use the second primary coil L2 350b coupled to the secondary coil L3 350c to provide a differential signal 357 from the second input signal 118 to the shared mixer 232.

Figure 5:
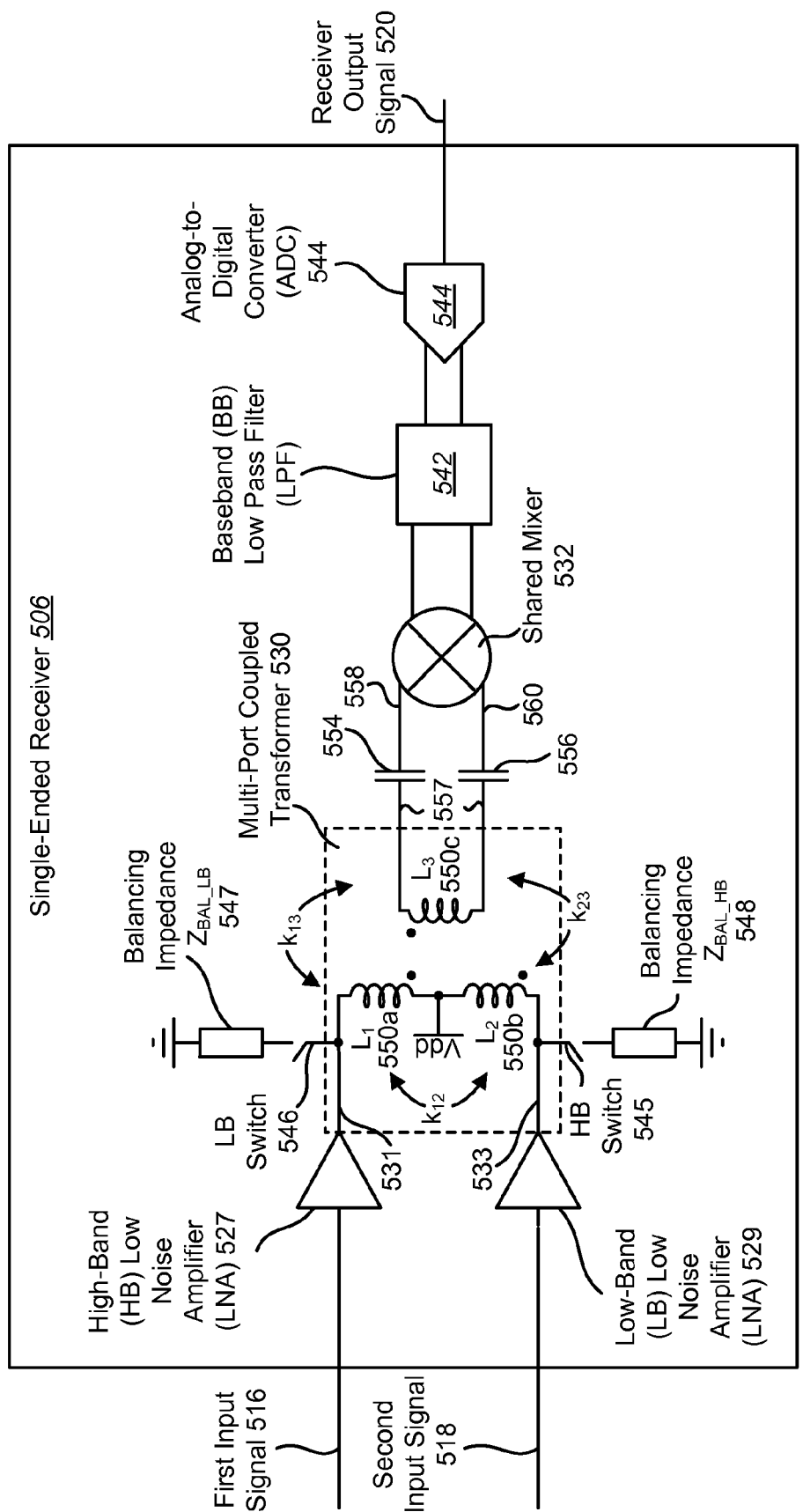
FIG. 5 is a block diagram illustrating a single-ended receiver that includes a multi-port coupled transformer and multiple balancing impedances.

FIG. 5 is a block diagram illustrating a single-ended receiver 506 that includes a multi-port coupled transformer 530 and multiple balancing impedances 547, 548. The single-ended receiver 506 of FIG. 5 may be one configuration of the single-ended receiver 106 described in connection with FIG. 1. The single-ended receiver 506 may have a large area penalty and loading issues.

The single-ended receiver 506 may also include a shared mixer 532, a baseband (BB) low pass filter (LPF) 542 and an analog-to-digital converter (ADC) 544. Although the single-ended receiver 506 is illustrated with only one channel, the channel may include an inphase portion and a quadrature portion that are not shown. The channel may be either single-ended or differential.

The single-ended receiver 506 may use a multi-port coupled transformer 530 to provide a differential signal 557 to the shared mixer 532. A low-band (LB) path and a high-band (HB) path may share the multi-port coupled transformer 530 and the shared mixer 532.

The single-ended receiver 506 may receive a first input signal 516 and a second input signal 518. The first input signal 516 may be provided to a high-band (HB) low noise amplifier (LNA) 527. The second input signal 518 may be provided to a low-band (LB) low noise amplifier (LNA) 529. In this example, the low-band (LB) may be the 800 megahertz (MHz) frequency band and the high-band (HB) may be the 1.99 GHz frequency band. In some configurations, additional low noise amplifiers (LNA) may be employed to receive additional input signals and/or provide additional amplified input signals to the multi-port coupled transformer 530.

The high-band (HB) low noise amplifier (LNA) 527 may output a high-band (HB) amplified input signal 531. The low-band (LB) low noise amplifier (LNA) 529 may output a low-band (LB) amplified input signal 533. Both the high-band (HB) amplified input signal 531 and the low-band (LB) amplified input signal 533 may be provided to the multi-port coupled transformer 530. The multi-port coupled transformer 530 may include a first primary coil L1 550a, a second primary coil L2 550b and a secondary coil L3 550c. The multi-port coupled transformer 530 may also include a center tap that is coupled between the first primary coil L1 550a and the second primary coil L2 550b. The center tap may be coupled to a voltage supply (Vdd).

A first coupling may occur between the first primary coil L1 550a and the second primary coil L2 550b. The first coupling may have a coupling coefficient of k12. The first coupling may be such that the first primary coil L1 550a and the second primary coil L2 550b are tightly coupled as a differential inductor. One example of a layout where the first primary coil L1 550a and the second primary coil L2 550b are tightly coupled as a differential inductor is given in FIG. 11. The tight coupling between the first primary coil L1 550a and the second primary coil L2 550b may result in a large power supply rejection.

A second coupling may occur between the first primary coil L1 550a and the secondary coil L3 550c. The second coupling may have a coupling coefficient of k13. A third coupling may occur between the second primary coil L2 550b and the secondary coil L3 550c. The third coupling may have a coupling coefficient of k23. In other words, the mutually coupled coils/inductors L1 550a, L2 550b and L3 550c may couple each other (with coupling coefficients k12, k13 and k23). The technique assumes that some current flows through the second primary coil L2 550b when the high-band (HB) low noise amplifier (LNA) 527 is operating and the low-band (LB) low noise amplifier (LNA) 529 is off. Similarly, this technique assumes that some current flows through the first primary coil L1 550a when the low-band (LB) low noise amplifier (LNA) 529 is operating and the high-band (HB) low noise amplifier (LNA) 527 is off.

The output of the high-band (HB) low noise amplifier (LNA) 527 may be coupled to the first primary coil L1 550a. The output of the low-band (LB) low noise amplifier (LNA) 529 may be coupled to the second primary coil L2 550b. The secondary coil L3 550c may be coupled between a first input 558 of the shared mixer 532 and a second input 560 of the shared mixer 532.

In one configuration, either the first input signal 516 or the second input signal 518 is active. If the first input signal 516 is active (and thus the second input signal 518 is inactive), the multi-port coupled transformer 530 may provide a differential signal 557 of the first input signal 516 to the shared mixer 532. Likewise, if the second input signal 518 is active (and thus the first input signal 516 is inactive), the multi-port coupled transformer 530 may provide a differential signal 557 of the second input signal 518 to the shared mixer 532.

If the off impedance of one low noise amplifier (LNA) is very different from the on impedance of the other low noise amplifier (LNA), then AC current does not flow through both the first primary coil L1 550a and the second primary coil L2

550b, limiting the power supply rejection. To improve the power supply rejection, balancing impedances 547, 548 may be added to the single-ended receiver 506. For example, the balancing impedance $Z_{BAL\_LB}$ 547 may be coupled to the output of the high-band (HB) low noise amplifier (LNA) 527 via an LB switch 546 and to ground. The balancing impedance $Z_{BAL\_HB}$ 548 may be coupled to the output of the low-band (LB) low noise amplifier (LNA) 529 via an HB switch 545 and to ground. The LB switch 546 may remove the balancing impedance $Z_{BAL\_LB}$ 547 from the multi-port coupled transformer 530 when the high-band (HB) low noise amplifier (LNA) 527 is on. Likewise, the HB switch 545 may remove the balancing impedance $Z_{BAL\_HB}$ 548 from the multi-port coupled transformer 530 when the low-band (LB) low noise amplifier (LNA) 529 is on.

The balancing impedance $Z_{BAL\_HB}$ 548 may be implemented such that the off impedance of the low-band (LB) low noise amplifier (LNA) 529 combined with the balancing impedance $Z_{BAL\_HB}$ 548 equals the on impedance of the high-band (HB) low noise amplifier (LNA) 527. Likewise, the balancing impedance $Z_{BAL\_LB}$ 547 may be implemented such that the off impedance of the high-band (HB) low noise amplifier (LNA) 527 combined with the balancing impedance $Z_{BAL\_LB}$ 547 equals the on impedance of the low-band (LB) low noise amplifier (LNA) 529. Further, in another configuration, the balancing impedance $Z_{BAL\_LB}$ 547 may be coupled to the output of the high-band (HB) low noise amplifier (LNA) 527 and the LB switch 546 may be coupled in series with the balancing impedance $Z_{BAL\_LB}$ 547 to ground. Similarly, the balancing impedance $Z_{BAL\_HB}$ 548 may be coupled to the output of the low-band (LB) low noise amplifier (LNA) 529 and the HB switch 545 may be coupled in series with the balancing impedance $Z_{BAL\_HB}$ 548 and ground. A theoretical analysis shows that balance is obtained when Equation (1) is satisfied:

$$Z_{BAL} \approx \left(\frac{k_{23}}{k_{13}}\right)\sqrt{\frac{L_2}{L_1}} Z_{LNA} \quad (1)$$

$$Z_{BAL} = Z_{off,LB} \| Z_{BALf,HB}$$

or $$Z_{BAL} = Z_{off,HB} \| Z_{BAL,LB}.$$

In Equation (1), $Z_{BAL}$ is the effective balancing impedance 143. $Z_{LNA}$ is the on impedance of a low noise amplifier (LNA) 228. The effective balancing impedance 143 may thus be a parallel combination of the off impedance of the low noise amplifier (LNA) 228 and the balancing impedance (either $Z_{BAL\_LB}$ 547 or $Z_{BAL\_HB}$ 548, depending on which low noise amplifier (LNA) is on).

It may be assumed that $L_{m13}=k_{13}\sqrt{L_1 L_3}$, $L_{m23}=k_{23}\sqrt{L_2 L_3}$ and $L_{m12}=k_{12}\sqrt{L_1 L_2}$. A theoretical analysis for complete power supply rejection requires that Equation (2) be satisfied:

$$Z_{BAL} = \left(\frac{k_{23}}{k_{13}}\right) \cdot \sqrt{\frac{L_2}{L_1}} \cdot Z_{LNA} + \quad (2)$$

$$j\omega \cdot \left[\left(\frac{k_{23}}{k_{13}}\right) \cdot \sqrt{\frac{L_2}{L_1}} \cdot \left(L_1 + k_{12}\sqrt{L_1 L_2}\right) - \left(L_2 + k_{12}\sqrt{L_1 L_2}\right)\right].$$

In Equation (2), $Z_{BAL}=Z_{off,LB}\|Z_{BALf,HB}$ or $Z_{BAL}=Z_{off,HB}\|Z_{BALf,LB}$. Equation (2) is thus independent of the secondary coil L3 350c.

A single shared mixer 532 may be used in the single-ended receiver 506 to process both the first input signal 516 and the second input signal 518. As an additional benefit of the multi-port coupled transformer, channel degradation may be reduced and in some cases, eliminated. Furthermore, the single-ended receiver 506 may operate without the use of switches to switch transformers on or off. Because the number of required components is reduced, the single-ended receiver 506 may occupy less die area/printed circuit board area than a differential receiver.

In one configuration, a first capacitor 554 may be coupled between the secondary coil L3 550c and the first input 558 of the shared mixer 532. Likewise, a second capacitor 556 may be coupled between the secondary coil L3 550c and the second input 560 of the shared mixer 532. In another configuration, the capacitors 554, 556 may be removed and the secondary coil 550c may be directly coupled to the shared mixer 532.

The shared mixer 532 may process the differential signal 557. The shared mixer 532 may provide the processed signals to a baseband (BB) low pass filter (LPF) 542 and an analog-to-digital converter (ADC) 544. The analog-to-digital converter (ADC) 544 may provide at least one receiver output signal 520.

The single-ended receiver 506 may have equal or less transformer area than other receivers due to the differential inductor implementation of the first primary coil L1 550a and the second primary coil L2 550b rather than as two separate coils. The single-ended receiver 506 may also have higher power supply rejection without requiring external components or additional power consumption. The single-ended receiver 506 may have a small area penalty to implement programmable balancing impedances 547, 548. In another configuration (not shown), additional low noise amplifiers (LNAs) may be coupled in parallel at the output of the high-band (HB) low noise amplifier (LNA) 527 and the output of the low-band (LB) low noise amplifier (LNA) 529, respectively. The single-ended receiver 506 is not limited to a shared transformer. Thus, the single-ended receiver 506 may include any transformer, as described below in relation to FIG. 6 and FIG. 7. A shared transformer is used in FIG. 8 and FIG. 9 for convenience.

Figure 6:
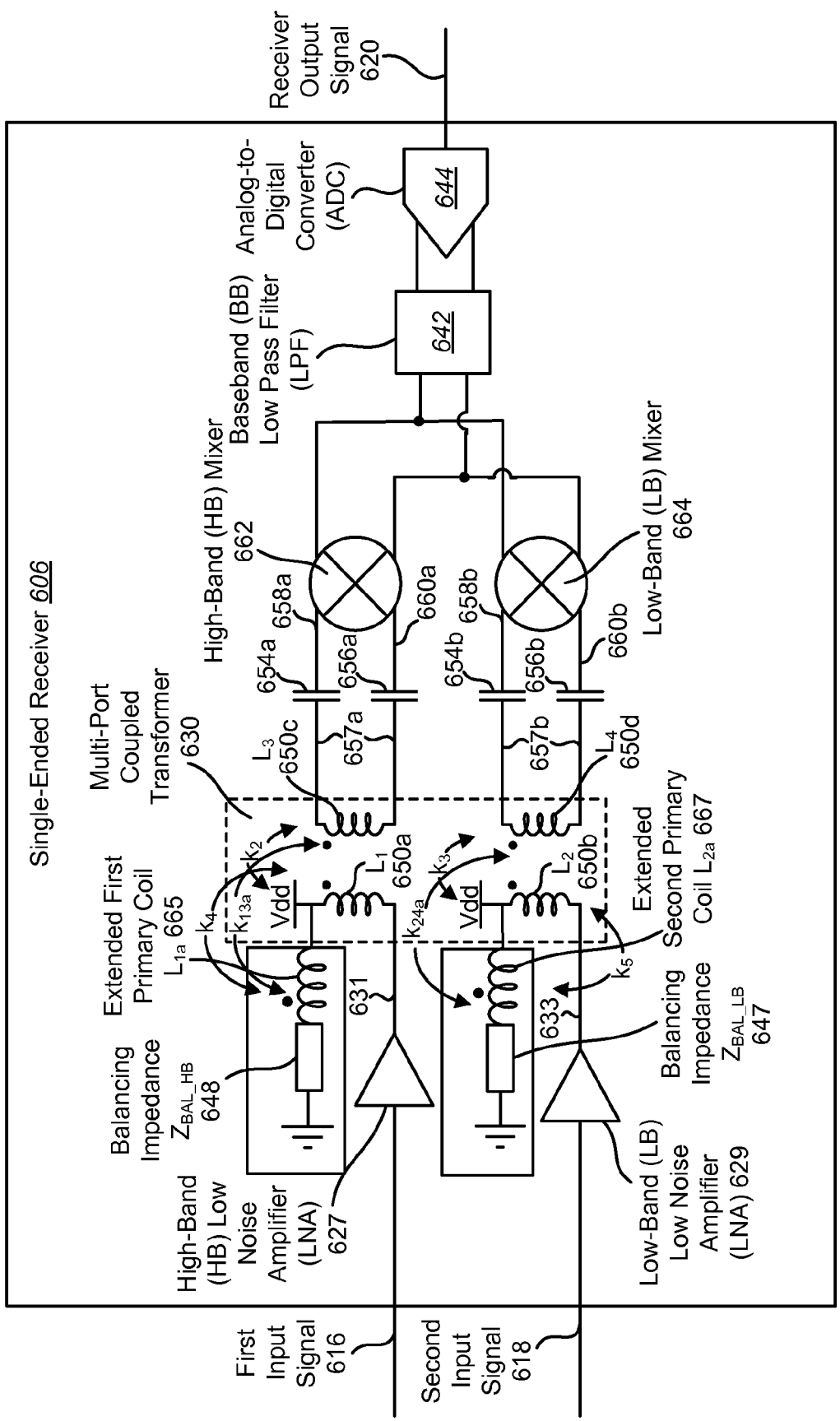
FIG. 6 is a block diagram illustrating another single-ended receiver that includes a multi-port coupled transformer and multiple balancing impedances.

FIG. 6 is a block diagram illustrating another single-ended receiver 606 that includes a multi-port coupled transformer 630 and multiple balancing impedances 647, 648. The single-ended receiver 606 of FIG. 6 may be one configuration of the single-ended receiver 106 described in connection with FIG. 1. The single-ended receiver 606 may include a high-band (HB) mixer 662, a low-band (LB) mixer 664, a baseband (BB) low pass filter (LPF) 642 and an analog-to-digital converter (ADC) 644. Although the single-ended receiver 606 is illustrated with only one channel, the channel may include an inphase portion and a quadrature portion that are not shown. The channel may be either single-ended or differential.

The single-ended receiver 606 may use a multi-port coupled transformer 630 to provide differential signals 657 to the high-band (HB) mixer 662 and the low-band (LB) mixer 664. A low-band (LB) path and a high-band (HB) path may share the multi-port coupled transformer 630.

The single-ended receiver 606 may receive a first input signal 616 and a second input signal 618. The first input signal 616 may be provided to a high-band (HB) low noise amplifier (LNA) 627. The second input signal 618 may be provided to a low-band (LB) low noise amplifier (LNA) 629. In some configurations, additional low noise amplifiers (LNA) may be employed to receive additional input signals and/or provide additional amplified input signals to the multi-port coupled transformer 630.

The high-band (HB) low noise amplifier (LNA) 627 may output a high-band (HB) amplified input signal 631. The low-band (LB) low noise amplifier (LNA) 629 may output a low-band (LB) amplified input signal 633. Both the high-band (HB) amplified input signal 631 and the low-band (LB) amplified input signal 633 may be provided to the multi-port coupled transformer 630. The multi-port coupled transformer 630 may include a first primary coil L1 650a, an extended first primary coil L1a 665, a second primary coil L2 650b, an extended second primary coil L2a 667, a first secondary coil L3 650c and a second secondary coil L4 650d. In one configuration, the extended first primary coil L1a 665 and the extended second primary coil L2a 667 may be extensions of the first primary coil L1 650a and the second primary coil L2 650b, respectively. For example, the extended first primary coil L1a 665 may have approximately 10% of the inductance of the first primary coil L1 650a. Likewise, the extended second primary coil L2a 667 may have approximately 10% of the inductance of the second primary coil L2 650b.

The first primary coil L1 650a may be coupled between the output of the high-band (HB) low noise amplifier (LNA) 627 and Vdd. The extended first primary coil L1a 665 may be coupled between Vdd and a balancing impedance $Z_{BAL\_HB}$ 648. The balancing impedance $Z_{BAL\_HB}$ 648 may also be coupled to ground. The second primary coil L2 650b may be coupled between the output of the low-band (LB) low noise amplifier (LNA) 629 and Vdd. The extended second primary coil L2a 667 may be coupled between Vdd and a balancing impedance $Z_{BAL\_LB}$ 647. The balancing impedance $Z_{BAL\_LB}$ 647 may also be coupled to ground.

A coupling may occur between the extended first primary coil L1a 665 and the first secondary coil L3 650c. The coupling may have a coupling coefficient of k13a. A coupling may occur between the extended second primary coil L2a 667 and the second secondary coil L4 650d. The coupling may have a coupling coefficient of k24a.

A second coupling may occur between the first primary coil L1 650a and the first secondary coil L3 650c. The second coupling may have a coupling coefficient of k2. A third coupling may occur between the second primary coil L1 650b and the second secondary coil L4 650d. The third coupling may have a coupling coefficient of k3. A fourth coupling may occur between the first primary coil L1 650a and the extended first primary coil L1a 665. The fourth coupling may have a coupling coefficient of k4. A fifth coupling may occur between the second primary coil L2 650b and the extended second primary coil L2a 667. The fifth coupling may have a coupling coefficient of k5.

The output of the high-band (HB) low noise amplifier (LNA) 627 may be coupled to the first primary coil L1 650a. The output of the low-band (LB) low noise amplifier (LNA) 629 may be coupled to the second primary coil L2 650b.

In one configuration, either the first input signal 616 or the second input signal 618 is active. If the first input signal 616 is active (and thus the second input signal 618 is inactive), the multi-port coupled transformer 630 may provide a differential signal 657 of the first input signal 616 to the high-band (HB) mixer 662. Likewise, if the second input signal 618 is active (and thus the first input signal 616 is inactive), the multi-port coupled transformer 630 may provide a differential signal 657 of the second input signal 618 to the low-band (LB) mixer 664.

To improve the power supply rejection, balancing impedances 647, 648 may be added to the single-ended receiver 606. For example, the balancing impedance $Z_{BAL\_LB}$ 647 may be coupled between the extended second primary coil L2a 667 and ground. The balancing impedance $Z_{BAL\_HB}$ 648 may be coupled between the extended first primary coil L1a 665 and ground.

The balancing impedance $Z_{BAL\_HB}$ 648 may be implemented such that it is equal to the scaled on impedance of the high-band (HB) low noise amplifier (LNA) 627, as indicated above in Equation (1). Likewise, the balancing impedance $Z_{BAL\_LB}$ 647 may be implemented such that the off impedance of the high-band (HB) low noise amplifier (LNA) 627 combined with the balancing impedance $Z_{BAL\_LB}$ 647 equals the scaled on impedance of the low-band (LB) low noise amplifier (LNA) 629, as indicated above in Equation (1).

The first secondary inductor L3 650c may be coupled to both inputs of the high-band (HB) mixer 662. In one configuration, a first capacitor 654a may be coupled between the first secondary coil L3 650c and the first input 658a of the high-band (HB) mixer 662. Likewise, a second capacitor 656a may be coupled between the first secondary coil L3 650c and the second input 660a of the high-band (HB) mixer 662. The second secondary inductor L4 650d may be coupled to both inputs of a low-band (LB) mixer 664. In one configuration, a third capacitor 654b may be coupled between the second secondary coil L4 650d and the first input 658b of the low-band (LB) mixer 664. Likewise, a fourth capacitor 656b may be coupled between the second secondary coil L4 650d and the second input 660b of the low-band (LB) mixer 664. In another configuration, the capacitors 654a, 656a may be removed and the secondary coil 650c may be directly coupled to the shared high-band (HB) mixer 662. Also, the capacitors 654b, 656b may be removed and the secondary coil 650d may be directly coupled to the shared low-band (LB) mixer 664.

The high-band (HB) mixer 662 and the low-band (LB) mixer 664 provide processed signals to a baseband (BB) low pass filter (LPF) 642 and an analog-to-digital converter (ADC) 644. The analog-to-digital converter (ADC) 644 may provide at least one receiver output signal 620, which may be single-ended or differential. In one configuration (not shown), additional low noise amplifiers (LNAs) may be coupled in parallel to the outputs of the high-band (HB) low noise amplifier (LNA) 627 and the low-band low noise amplifier (LNA) 629, respectively.

Figure 7:
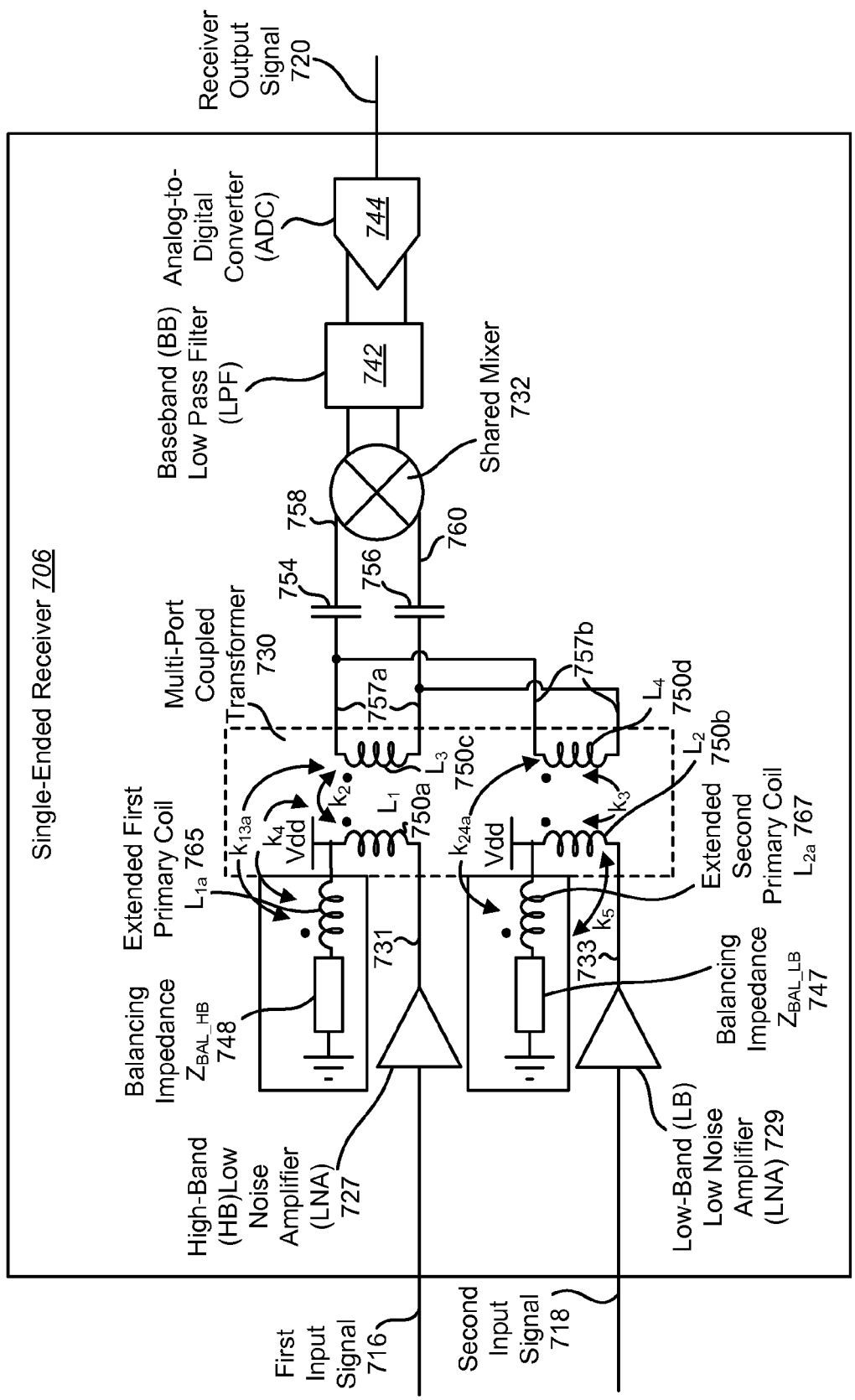
FIG. 7 is a block diagram illustrating yet another single-ended receiver that includes a multi-port coupled transformer and multiple balancing impedances.

FIG. 7 is a block diagram illustrating yet another single-ended receiver 706 that includes a multi-port coupled transformer 730 and multiple balancing impedances 747, 748. The single-ended receiver 706 of FIG. 7 may be one configuration of the single-ended receiver 106 described in connection with FIG. 1. The single-ended receiver 706 may include a shared mixer 732, a baseband (BB) low pass filter (LPF) 742 and an analog-to-digital converter (ADC) 744. Although the single-ended receiver 706 is illustrated with only one channel, the channel may include an inphase portion and a quadrature portion that are not shown. The channel may be either single-ended or differential.

The single-ended receiver 706 may use a multi-port coupled transformer 730 to provide differential signals 757a-b to the shared mixer. A low-band (LB) path and a high-band (HB) path may share the multi-port coupled transformer 730.

The single-ended receiver 706 may receive a first input signal 716 and a second input signal 718. The first input signal 716 may be provided to a high-band (HB) low noise amplifier (LNA) 727. The second input signal 718 may be provided to a low-band (LB) low noise amplifier (LNA) 729. In some configurations, additional low noise amplifiers (LNA) may be employed to receive additional input signals and/or provide additional amplified input signals to the multi-port coupled transformer 730.

The high-band (HB) low noise amplifier (LNA) 727 may output a high-band (HB) amplified input signal 731. The low-band (LB) low noise amplifier (LNA) 729 may output a low-band (LB) amplified input signal 733. Both the high-band (HB) amplified input signal 731 and the low-band (LB) amplified input signal 733 may be provided to the multi-port coupled transformer 730. The multi-port coupled transformer 730 may include a first primary coil L1 750a, an extended first primary coil L1a 765, a second primary coil L2 750b, an extended second primary coil L2a 767, a first secondary coil L3 750c and a second secondary coil L4 750d. In one configuration, the extended first primary coil L1a 765 and the extended second primary coil L2a 767 may be extensions of the first primary coil L1 750a and the second primary coil L2 750b, respectively. For example, the extended first primary coil L1a 765 may have approximately 10% of the inductance of the first primary coil L1 750a. Likewise, the extended second primary coil L2a 767 may have approximately 10% of the inductance of the second primary coil L2 750b.

The first primary coil L1 750a may be coupled between the output of the high-band (HB) low noise amplifier (LNA) 727 and Vdd. The extended first primary coil L1a 765 may be coupled between Vdd and a balancing impedance $Z_{BAL\_HB}$ 748. The balancing impedance $Z_{BAL\_HB}$ 748 may also be coupled to ground. The second primary coil L2 750b may be coupled between the output of the low-band (LB) low noise amplifier (LNA) 729 and Vdd. The extended second primary coil L2a 767 may be coupled between Vdd and a balancing impedance $Z_{BAL\_LB}$ 747. The balancing impedance $Z_{BAL\_LB}$ 747 may also be coupled to ground.

A coupling may occur between the extended first primary coil L1a 765 and the first secondary coil L3 750c. The coupling may have a coupling coefficient of k13a. A coupling may occur between the extended second primary coil L2a 767 and the second secondary coil L4 750d. The coupling may have a coupling coefficient of k24a.

A second coupling may occur between the first primary coil L1 750a and the first secondary coil L3 750c. The second coupling may have a coupling coefficient of k2. A third coupling may occur between the second primary coil L1 750b and the second secondary coil L4 750d. The third coupling may have a coupling coefficient of k3. A fourth coupling may occur between the first primary coil L1 750a and the extended first primary coil L1a 765. The fourth coupling may have a coupling coefficient of k4. A fifth coupling may occur between the second primary coil L2 750b and the extended second primary coil L2a 767. The fifth coupling may have a coupling coefficient of k5.

The output of the high-band (HB) low noise amplifier (LNA) 727 may be coupled to the first primary coil L1 750a. The output of the low-band (LB) low noise amplifier (LNA) 729 may be coupled to the second primary coil L2 750b.

In one configuration, either the first input signal 716 or the second input signal 718 is active. If the first input signal 716 is active (and thus the second input signal 718 is inactive), the multi-port coupled transformer 730 may provide a differential signal 757a of the first input signal 716 to the shared mixer 732. Likewise, if the second input signal 718 is active (and thus the first input signal 716 is inactive), the multi-port coupled transformer 730 may provide a differential signal 757b of the second input signal 718 to the shared mixer 732.

To improve the power supply rejection, balancing impedances 747, 748 may be added to the single-ended receiver 706. For example, the balancing impedance $Z_{BAL\_LB}$ 747 may be coupled between the extended second primary coil L2a 767 and ground. The balancing impedance $Z_{BAL\_HB}$ 748 may be coupled between the extended first primary coil L1a 765 and ground.

The balancing impedance $Z_{BAL\_HB}$ 748 may be implemented such that it equals the scaled on impedance of the high-band (HB) low noise amplifier (LNA) 727, according to Equation (1). Likewise, the balancing impedance $Z_{BAL\_LB}$ 747 may be implemented such that it equals the scaled on impedance of the low-band (LB) low noise amplifier (LNA) 729.

The first secondary inductor L3 750c may be coupled to both inputs of the shared mixer 732. In one configuration, a first capacitor 754 may be coupled between the first secondary coil L3 750c and the first input 758 of the shared mixer 732. Likewise, a second capacitor 756 may be coupled between the first secondary coil L3 750c and the second input 760 of the shared mixer 732. The second secondary inductor L4 750d may also be coupled to both inputs of the shared mixer 732. In another configuration, the capacitors 754, 756 may be removed and the secondary coils 750c and 750d may be directly coupled to the shared mixer 732.

The shared mixer 732 may provide processed signals to a baseband (BB) low pass filter (LPF) 742 and an analog-to-digital converter (ADC) 744. The analog-to-digital converter (ADC) 744 may provide at least one receiver output signal 720. The receiver output signal 720 may be single-ended or differential. In one configuration, multiple low noise amplifiers (LNAs) (not shown) may be connected in parallel at the output of the high-band (HB) low noise amplifier (LNA) 727 and the output of the low-band (LB) low noise amplifier (LNA) 729, respectively.

Figure 8:
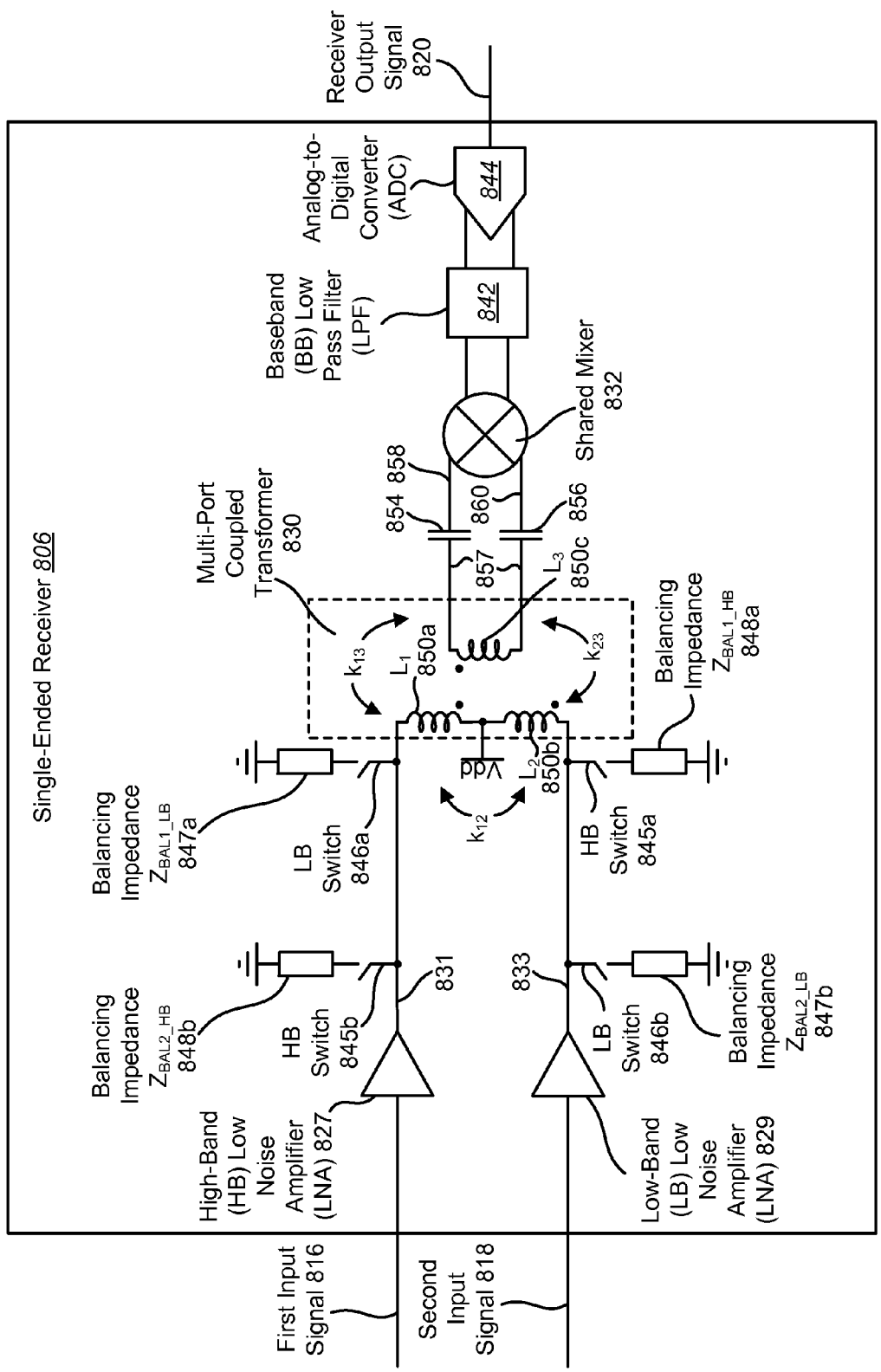
FIG. 8 is a block diagram illustrating another single-ended receiver that includes a multi-port coupled transformer and multiple balancing impedances.

FIG. 8 is a block diagram illustrating another single-ended receiver 806 that includes a multi-port coupled transformer 830 and multiple balancing impedances 847a-b, 848a-b. The single-ended receiver 806 of FIG. 8 may be one configuration of the single-ended receiver 106 described in connection with FIG. 1. The single-ended receiver 806 may also include a shared mixer 832, a baseband (BB) low pass filter (LPF) 842 and an analog-to-digital converter (ADC) 844. Although the single-ended receiver 806 is illustrated with only one channel, the channel may include an inphase portion and a quadrature portion that are not shown. The channel may be either single-ended or differential.

The single-ended receiver 806 may use a multi-port coupled transformer 830 to provide a differential signal 857 to the shared mixer 832. A low-band (LB) path and a high-band (HB) path may share the multi-port coupled transformer 830 and the shared mixer 832.

The single-ended receiver 806 may receive a first input signal 816 and a second input signal 818. The first input signal 816 may be provided to a high-band (HB) low noise amplifier (LNA) 827. The second input signal 818 may be provided to a low-band (LB) low noise amplifier (LNA) 829. In some configurations, additional low noise amplifiers (LNA) may be employed to receive additional input signals and/or provide additional amplified input signals to the multi-port coupled transformer 830.

The high-band (HB) low noise amplifier (LNA) 827 may output a high-band (HB) amplified input signal 831. The low-band (LB) low noise amplifier (LNA) 829 may output a low-band (LB) amplified input signal 833. Both the high-band (HB) amplified input signal 831 and the low-band (LB) amplified input signal 833 may be provided to the multi-port coupled transformer 830. The multi-port coupled transformer 830 may include a first primary coil L1 850a, a second primary coil L2 850b and a secondary coil L3 850c. The multi-port coupled transformer 830 may also include a center tap that is between the first primary coil L1 850a and the second primary coil L2 850b. The center tap may be coupled to a voltage supply (Vdd).

A first coupling may occur between the first primary coil L1 850a and the second primary coil L2 850b. The first coupling may have a coupling coefficient of k12. The first coupling may be such that the first primary coil L1 850a and the second primary coil L2 850b are tightly coupled as a differential inductor. One example of a layout where the first primary coil L1 850a and the second primary coil L2 850b are tightly coupled as a differential inductor is given in FIG. 11. The tight coupling between the first primary coil L1 850a and the second primary coil L2 850b may result in a large power supply rejection.

A second coupling may occur between the first primary coil L1 850a and the secondary coil L3 850c. The second coupling may have a coupling coefficient of k13. A third coupling may occur between the second primary coil L2 850b and the secondary coil L3 850c. The third coupling may have a coupling coefficient of k23. In other words, the mutually coupled coils/inductors L1 850a, L2 850b and L3 850c may couple each other (with coupling coefficients k12, k13 and k23). The technique assumes that some AC current flows through the second primary coil L2 850b when the high-band (HB) low noise amplifier (LNA) 827 is on and the low-band (LB) low noise amplifier (LNA) 829 is off. Similarly, this technique assumes that some AC current flows through the first primary coil L1 850a when the high-band (HB) low noise amplifier (LNA) 827 is off and the low-band (LB) low noise amplifier (LNA) 829 is on.

The output of the high-band (HB) low noise amplifier (LNA) 827 may be coupled to the first primary coil L1 850a. The output of the low-band (LB) low noise amplifier (LNA) 829 may be coupled to the second primary coil L2 850b. The secondary coil L3 850c may be coupled between a first input 858 of the shared mixer 832 and a second input 860 of the shared mixer 832.

In one configuration, either the first input signal 816 or the second input signal 818 is active. If the first input signal 816 is active (and thus the second input signal 818 is inactive), the multi-port coupled transformer 830 may provide a differential signal 857 of the first input signal 816 to the shared mixer 832. Likewise, if the second input signal 818 is active (and thus the first input signal 816 is inactive), the multi-port coupled transformer 830 may provide a differential signal 857 of the second input signal 818 to the shared mixer 832. Thus, if the first input signal 816 is active, the first primary coil L1 850a is said to be on and the second primary coil L2 850b is said to be off.

If the off impedance of one low noise amplifier (LNA) is very different from the on impedance of the other low noise amplifier (LNA), then AC current does not flow through both the first primary coil L1 850a and the second primary coil L2 850b, limiting the power supply rejection. To improve the power supply rejection, multiple balancing impedances 847a-b, 848a-b may be added to the single-ended receiver 806. For example, the balancing impedance $Z_{BAL1\_LB}$ 847a may be coupled to the output of the high-band (HB) low noise amplifier (LNA) 827 via a first LB switch 846a and to ground. The balancing impedance $Z_{BAL1\_HB}$ 848a may be coupled to the output of the low-band (LB) low noise amplifier (LNA) 829 via a first HB switch 845a and to ground. The balancing impedance $Z_{BAL2\_HB}$ 848b may be coupled to the output of the high-band (HB) low noise amplifier (LNA) 827 via a second HB switch 845b and to ground. The balancing impedance $Z_{BAL2\_LB}$ 847b may be coupled to the output of the low-band (LB) low noise amplifier (LNA) 829 via a second LB switch 846b and to ground.

The first LB switch 846a may remove the balancing impedance $Z_{BAL1\_LB}$ 847a from the multi-port coupled transformer 830 when the high-band (HB) low noise amplifier (LNA) 827 is on. Likewise, the second LB switch 846b may remove the balancing impedance $Z_{BAL2\_LB}$ 847b from the multi-port coupled transformer 830 when the high-band (HB) low noise amplifier (LNA) 827 is on. The first HB switch 845a may remove the balancing impedance $Z_{BAL1\_HB}$ 848a from the multi-port coupled transformer 830 when the low-band (LB) low noise amplifier (LNA) 829 is on. Likewise, the second HB switch 845b may remove the balancing impedance $Z_{BAL2\_HB}$ 848b from the multi-port coupled transformer 830 when the low-band (LB) low noise amplifier (LNA) 829 is on.

The balancing impedances $Z_{BAL1\_HB}$ 848a and $Z_{BAL2\_HB}$ 848b may be implemented such that the off impedance of the low-band (LB) low noise amplifier (LNA) 829 combined with the balancing impedances $Z_{BAL1\_HB}$ 848 equals the combined impedance of $Z_{BAL2\_HB}$ 848b and the on impedance of the high-band (HB) low noise amplifier (LNA) 827. Likewise, the balancing impedances $Z_{BAL1\_LB}$ 847a and $Z_{BAL2\_LB}$ 847b may be implemented such that the off impedance of the high-band (HB) low noise amplifier (LNA) 827 combined with the balancing impedance $Z_{BAL1\_LB}$ 847a equals the combined impedance of $Z_{BAL2\_LB}$ 847b and the on impedance of the low-band (LB) low noise amplifier (LNA) 829. Equation (1) and Equation (2) may be applied in a similar fashion to FIG. 8. Here, $Z_{LNA}$ (from Equation (2)) is the ON impedance of the low noise amplifier (LNA) combined with $Z_{BAL2}$.

A single shared mixer 832 may be used in the single-ended receiver 806 to process both the first input signal 816 and the second input signal 818. In one configuration, a first capacitor 854 may be coupled between the secondary coil L3 850c and the first input 858 of the shared mixer 832. Likewise, a second capacitor 856 may be coupled between the secondary coil L3 850c and the second input 860 of the shared mixer 832. In another configuration, the capacitors 854, 856 may be removed and the secondary coil 850c may be directly coupled to the shared mixer 832

The shared mixer 832 may process the differential signal 857. The shared mixer 832 may provide the processed signals to a baseband (BB) low pass filter (LPF) 842 and an analog-to-digital converter (ADC) 844. The analog-to-digital converter (ADC) 844 may provide at least one receiver output signal 820, which may be single-ended or differential. In one configuration, multiple low noise amplifiers (LNAs) (not shown) may be connected in parallel at the output of the high-band (HB) low noise amplifier (LNA) 827 and the output of the low-band (LB) low noise amplifier (LNA) 829, respectively.

Figure 9:
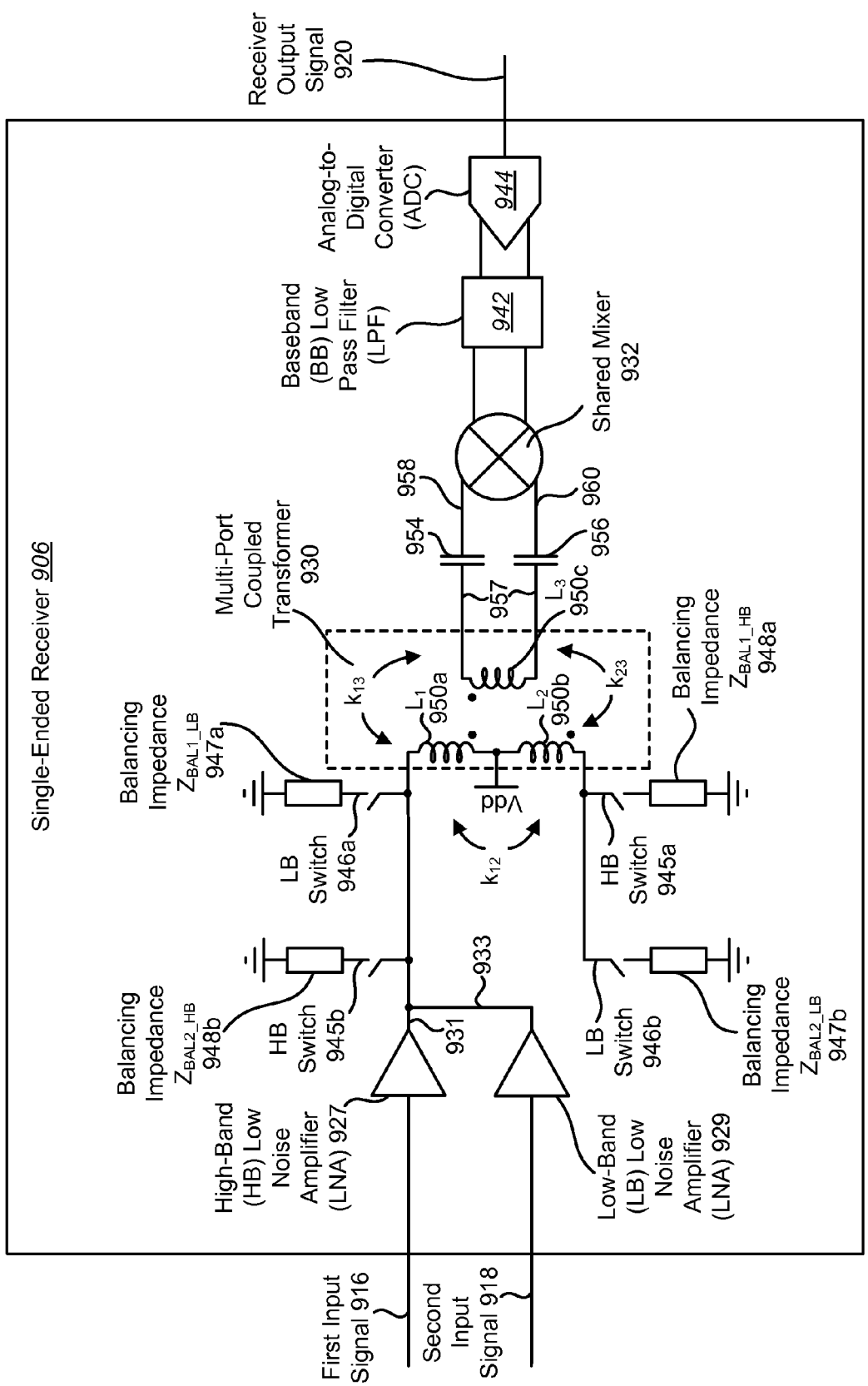
FIG. 9 is a block diagram illustrating yet another single-ended receiver that includes a multi-port coupled transformer and multiple balancing impedances.

FIG. 9 is a block diagram illustrating yet another single-ended receiver 906 that includes a multi-port coupled transformer 930 and multiple balancing impedances 947a-b, 948a-b. The single-ended receiver 906 of FIG. 9 may be one configuration of the single-ended receiver 106 described in connection with FIG. 1. The single-ended receiver 906 may also include a shared mixer 932, a baseband (BB) low pass filter (LPF) 942 and an analog-to-digital converter (ADC) 944. Although the single-ended receiver 906 is illustrated with only one channel, the channel may include an inphase portion and a quadrature portion that are not shown. The channel may be either single-ended or differential.

The single-ended receiver 906 may use a multi-port coupled transformer 930 to provide a differential signal 957 to the shared mixer 932. A low-band (LB) path and a highband (HB) path may share the multi-port coupled transformer 930 and the shared mixer 932.

The single-ended receiver 906 may receive a first input signal 916 and a second input signal 918. The first input signal 916 may be provided to a high-band (HB) low noise amplifier (LNA) 927. The second input signal 918 may be provided to a low-band (LB) low noise amplifier (LNA) 929. The high-band (HB) low noise amplifier (LNA) 927 may output a high-band (HB) amplified input signal 931. The low-band (LB) low noise amplifier (LNA) 929 may output a low-band (LB) amplified input signal 933. Both the high-band (HB) amplified input signal 931 and the low-band (LB) amplified input signal 933 may be provided to the multi-port coupled transformer 930. The multi-port coupled transformer 930 may include a first primary coil L1 950a, a second primary coil L2 950b and a secondary coil L3 950c. The multi-port coupled transformer 930 may also include a center tap that is between the first primary coil L1 950a and the second primary coil L2 950b. The center tap may be coupled to a voltage supply (Vdd).

A first coupling may occur between the first primary coil L1 950a and the second primary coil L2 950b. The first coupling may have a coupling coefficient of k12. The first coupling may be such that the first primary coil L1 950a and the second primary coil L2 950b are tightly coupled as a differential inductor. One example of a layout where the first primary coil L1 950a and the second primary coil L2 950b are tightly coupled as a differential inductor is given in FIG. 11. The tight coupling between the first primary coil L1 950a and the second primary coil L2 950b may result in a large power supply rejection.

A second coupling may occur between the first primary coil L1 950a and the secondary coil L3 950c. The second coupling may have a coupling coefficient of k13. A third coupling may occur between the second primary coil L2 950b and the secondary coil L3 950c. The third coupling may have a coupling coefficient of k23. In other words, the mutually coupled coils/inductors L1 950a, L2 950b and L3 950c may couple each other (with coupling coefficients k12, k13 and k23). The technique assumes that some current flows through the second primary coil L2 950b when either the high-band (HB) low noise amplifier (LNA) 927 or the low-band (LB) low noise amplifier (LNA) 929 is on.

Both the output of the high-band (HB) low noise amplifier (LNA) 927 and the output of the low-band (LB) low noise amplifier (LNA) 929 may be coupled to the first primary coil L1 950a. The secondary coil L3 950c may be coupled between a first input 958 of a shared mixer 932 and a second input 960 of the shared mixer 932.

In one configuration, either the first input signal 916 or the second input signal 918 is active. If the first input signal 916 is active (and thus the second input signal 918 is inactive), the multi-port coupled transformer 930 may provide a differential signal 957 of the first input signal 916 to the shared mixer 932. Likewise, if the second input signal 918 is active (and thus the first input signal 916 is inactive), the multi-port coupled transformer 930 may provide a differential signal 957 of the second input signal 918 to the shared mixer 932.

To improve the power supply rejection, multiple balancing impedances 947a-b, 948a-b may be added to the single-ended receiver 906. For example, the balancing impedance $Z_{BAL1\_LB}$ 947a may be coupled to the output of the high-band (HB) low noise amplifier (LNA) 927 and the low-band (LB) low noise amplifier (LNA) 929 via a first LB switch 946a and to ground. The balancing impedance $Z_{BAL1\_HB}$ 948a may be coupled to the second primary coil L2 950b via a first HB switch 945a and to ground. The balancing impedance $Z_{BAL2\_LB}$ 947b may be coupled to the second primary coil L2 950b via a second LB switch 946b and to ground. The balancing impedance $Z_{BAL2\_HB}$ 948b may be coupled to the output of the high-band (HB) low noise amplifier (LNA) 927 and the low-band (LB) low noise amplifier (LNA) 929 via a second HB switch 945b and to ground. Also, $Z_{BAL1\_HB}$ 948a may be different than $Z_{BAL1\_LB}$ 947a if the on impedances of the high-band (HB) low noise amplifier (LNA) 927 and the low-band (LB) low noise amplifier (LNA) 929 are different.

The first LB switch 946a may remove the balancing impedance $Z_{BAL1\_LB}$ 947a from the multi-port coupled transformer 930 when the high-band (HB) low noise amplifier (LNA) 927 is on. Likewise, the second LB switch 946b may remove the balancing impedance $Z_{BAL2\_LB}$ 947b from the multi-port coupled transformer 930 when the high-band (HB) low noise amplifier (LNA) 927 is on. The first HB switch 945a may remove the balancing impedance $Z_{BAL1\_HB}$ 948a from the multi-port coupled transformer 930 when the low-band (LB) low noise amplifier (LNA) 929 is on. Likewise, the second HB switch 945b may remove the balancing impedance $Z_{BAL2\_HB}$ 948b from the multi-port coupled transformer 930 when the low-band (LB) low noise amplifier (LNA) 929 is on.

The balancing impedances $Z_{BAL1\_HB}$ 948a and $Z_{BAL2\_HB}$ 948b may be implemented such that the off impedance of the low-band (LB) low noise amplifier (LNA) 929 combined with the balancing impedances $Z_{BAL1\_HB}$ 948a and $Z_{BAL2\_HB}$ 948b equals the on impedance of the high-band (HB) low noise amplifier (LNA) 927. Likewise, the balancing impedances $Z_{BAL1\_LB}$ 947a and $Z_{BAL2\_LB}$ 947b may be implemented such that the off impedance of the high-band (HB) low noise amplifier (LNA) 927 combined with the balancing impedances $Z_{BAL1\_LB}$ 947a and $Z_{BAL2\_LB}$ 947b equals the on impedance of the low-band (LB) low noise amplifier (LNA) 929. Equation (1) may be applied when the high-band (HB) low noise amplifier (LNA) 927 is ON. This gives $Z_{LNA} = Z_{on,HB} \| Z_{off,LB} \| Z_{BAL2,HB}$ and $Z_{BAL} = Z_{BAL1,HB}$. Similarly, when the low-band (LB) low noise amplifier (LNA) 929 is ON, $Z_{LNA} = Z_{on,LB} \| Z_{off,HB} \| Z_{BAL2,LB}$ and $Z_{BAL} = Z_{BAL1,LB}$.

A single shared mixer 932 may be used in the single-ended receiver 906 to process both the first input signal 916 and the second input signal 918. As an additional benefit of the multi-port coupled transformer 930, channel degradation may be reduced and in some cases, eliminated. Furthermore, the single-ended receiver 906 may operate without the use of switches to switch transformers on or off. Because the number of required components is reduced, the single-ended receiver 906 may occupy less die area/printed circuit board area than a differential receiver.

In one configuration, a first capacitor 954 may be coupled between the secondary coil L3 950c and the first input 958 of the shared mixer 932. Likewise, a second capacitor 956 may be coupled between the secondary coil L3 950c and the second input 960 of the shared mixer 932. In another configuration, the capacitors 954, 956 may be removed and the secondary coil 950c may be directly coupled to the shared mixer 932.

The shared mixer 932 may process the differential signal 957. The shared mixer 932 may provide the processed signals to a baseband (BB) low pass filter (LPF) 942 and an analog-to-digital converter (ADC) 944. The analog-to-digital converter (ADC) 944 may provide at least one receiver output signal 920, which may be single-ended or differential. In one configuration, multiple low noise amplifiers (LNAs) (not shown) may be connected in parallel at the output of the high-band (HB) low noise amplifier (LNA) 927 and the output of the low-band (LB) low noise amplifier (LNA) 929, respectively.

Figure 10:
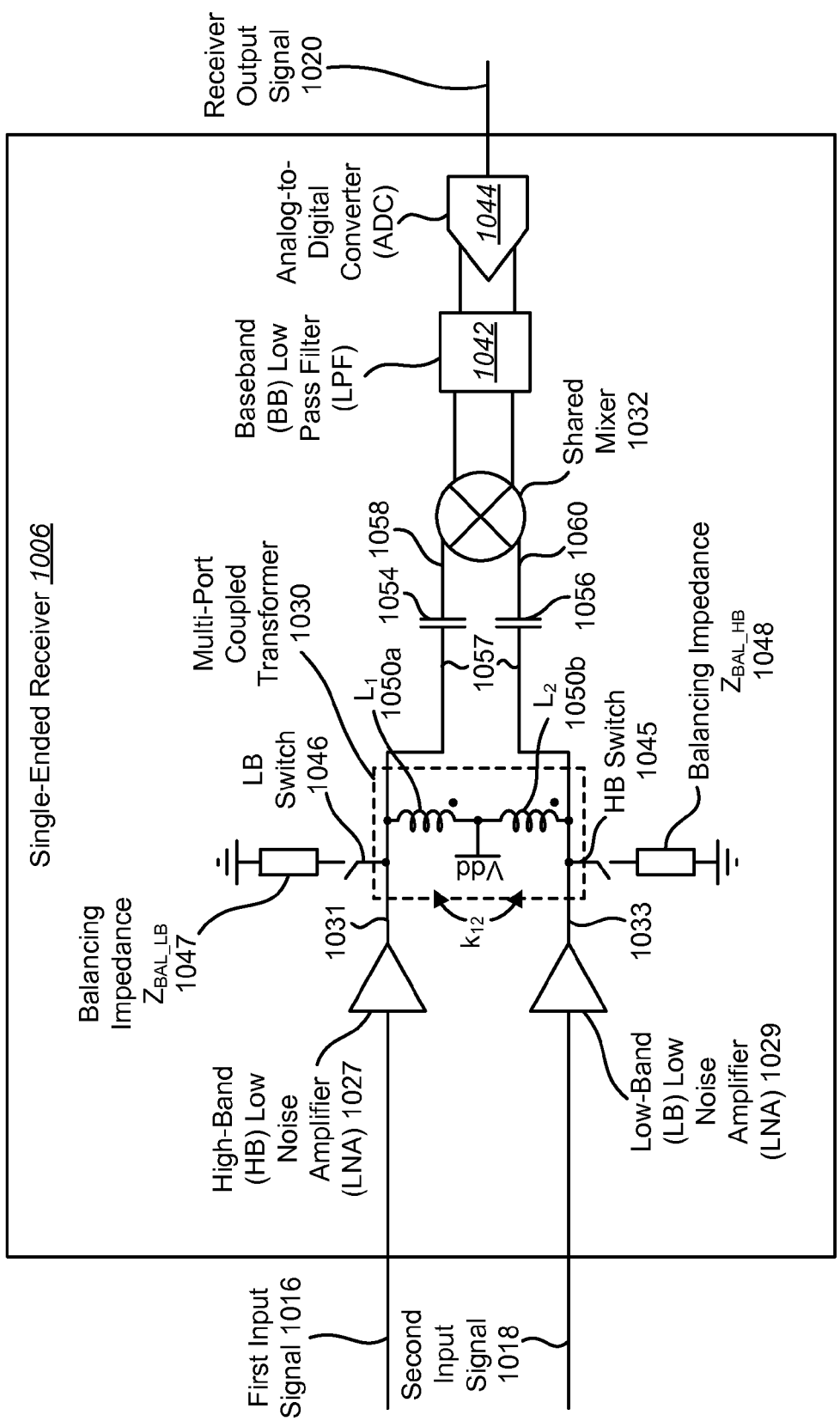
FIG. 10 is a block diagram illustrating another single-ended receiver that includes a multi-port coupled transformer and multiple balancing impedances.

FIG. 10 is a block diagram illustrating another single-ended receiver 1006 that includes a multi-port coupled transformer 1030 and multiple balancing impedances 1047, 1048. The single-ended receiver 1006 of FIG. 10 may be one configuration of the single-ended receiver 106 described in connection with FIG. 1. The single-ended receiver 1006 may also include a shared mixer 1032, a baseband (BB) low pass filter (LPF) 1042 and an analog-to-digital converter (ADC) 1044. Although the single-ended receiver 1006 is illustrated with only one channel, the channel may include an inphase portion and a quadrature portion that are not shown. The channel may be either single-ended or differential. In the single-ended receiver 1006, the secondary inductor has been removed and the differential output is tapped directly from the L1-L2 coupled inductors. This may provide additional area savings on the integrated circuit. However, in the single-ended receiver 1006, the symmetry between V+ and V− depends on the balance between the two halves.

The single-ended receiver 1006 may use a multi-port coupled transformer 1030 to provide a differential signal 1057 to the shared mixer 1032. A low-band (LB) path and a high-band (HB) path may share the multi-port coupled transformer 1030 and the shared mixer 1032.

The single-ended receiver 1006 may receive a first input signal 1016 and a second input signal 1018. The first input signal 1016 may be provided to a high-band (HB) low noise amplifier (LNA) 1027. The second input signal 1018 may be provided to a low-band (LB) low noise amplifier (LNA) 1029.

The high-band (HB) low noise amplifier (LNA) 1027 may output a high-band (HB) amplified input signal 1031. The low-band (LB) low noise amplifier (LNA) 1029 may output a low-band (LB) amplified input signal 1033. Both the high-band (HB) amplified input signal 1031 and the low-band (LB) amplified input signal 1033 may be provided to the multi-port coupled transformer 1030. The multi-port coupled transformer 1030 may include a first primary coil L1 1050a and a second primary coil L2 1050b. The multi-port coupled transformer 1030 may also include a center tap that is between the first primary coil L1 1050a and the second primary coil L2 1050b. The center tap may be coupled to a voltage supply (Vdd).

A coupling may occur between the first primary coil L1 1050a and the second primary coil L2 1050b. The coupling may have a coupling coefficient of k12. The coupling may be such that the first primary coil L1 1050a and the second primary coil L2 1050b are tightly coupled as a differential inductor. One example of a layout where the first primary coil L1 1050a and the second primary coil L2 1050b are tightly coupled as a differential inductor is given in FIG. 11. The tight coupling between the first primary coil L1 1050a and the second primary coil L2 1050b may result in a large power supply rejection.

The output of the high-band (HB) low noise amplifier (LNA) 1027 may be coupled to the first primary coil L1 1050a. The output of the high-band (HB) low noise amplifier (LNA) 1027 may also be coupled to a first input 1058 of the shared mixer 1032. The output of the low-band (LB) low noise amplifier (LNA) 1029 may be coupled to the second primary coil L2 1050b. The output of the low-band (LB) low noise amplifier (LNA) 1029 may also be coupled to a second input 1060 of the shared mixer 1032.

In one configuration, either the first input signal 1016 or the second input signal 1018 is active. If the first input signal 1016 is active (and thus the second input signal 1018 is inactive), the multi-port coupled transformer 1030 may provide a differential signal 1057 of the first input signal 1016 to the shared mixer 1032. Likewise, if the second input signal 1018 is active (and thus the first input signal 1016 is inactive), the multi-port coupled transformer 1030 may provide a differential signal 1057 of the second input signal 1018 to the shared mixer 1032.

If the off impedance of one low noise amplifier (LNA) is very different from the on impedance of the other low noise amplifier (LNA), then AC current does not flow through both the first primary coil L1 1050a and the second primary coil L2 1050b, limiting the power supply rejection. To improve the power supply rejection, balancing impedances may be added to the single-ended receiver 1006. For example, the balancing impedance $Z_{BAL\_LB}$ 1047 may be coupled to the output of the high-band (HB) low noise amplifier (LNA) 1027 via an LB switch 1046 and to ground. The balancing impedance $Z_{BAL\_HB}$ 1048 may be coupled to the output of the low-band (LB) low noise amplifier (LNA) 1029 via an HB switch 1045 and to ground. The LB switch 1046 may remove the balancing impedance $Z_{BAL\_LB}$ 1047 from the multi-port coupled transformer 1030 when the high-band (HB) low noise amplifier (LNA) 1027 is on. Likewise, the HB switch 1045 may remove the balancing impedance $Z_{BAL\_HB}$ 1048 from the multi-port coupled transformer 1030 when the low-band (LB) low noise amplifier (LNA) 1029 is on. A theoretical analysis shows that balance is obtained when Equation (3) is satisfied:

$$Z_{BAL} = \left(\frac{L_2 + L_m}{L_1 + L_m}\right) Z_{LNA}. \qquad (3)$$

In Equation (3), $L_m$ is the mutual inductance between the first primary coil L1 1050a and the second primary coil L2 1050b, where $L_m = k_{12}\mathrm{sqrt}(L1,L2)$. Equation (3) may be rewritten as $Z_{BAL} = Z_{off,LB} \| Z_{BAL,HB}$ or as $Z_{BAL} = Z_{off,HB} \| Z_{BAL,LB}$. Note that $Z_{LNA}$ is the ON impedance of the low noise amplifier (LNA) in Equation (3) above. A single shared mixer 1032 may be used in the single-ended receiver 1006 to process both the first input signal 1016 and the second input signal 1018. As an additional benefit of the multi-port coupled transformer 1030, channel degradation may be reduced and in some cases, eliminated. Furthermore, the single-ended receiver 1006 may operate without the use of switches to switch transformers on or off. Because the number of required components is reduced, the single-ended receiver 1006 may occupy less die area/printed circuit board area than a differential receiver.

In one configuration, a first capacitor 1054 may be coupled between the output of the high-band (HB) low noise amplifier (LNA) 1027 and the first input 1058 of the shared mixer 1032. Likewise, a second capacitor 1056 may be coupled between the output of the low-band (LB) low noise amplifier (LNA) 1029 and the second input 1060 of the shared mixer 1032.

The shared mixer 1032 may process the differential signal 1057. The shared mixer 1032 may provide the processed signals to a baseband (BB) low pass filter (LPF) 1042 and an analog-to-digital converter (ADC) 1044. The analog-to-digital converter (ADC) 1044 may provide at least one receiver output signal 1020.

Figure 11:
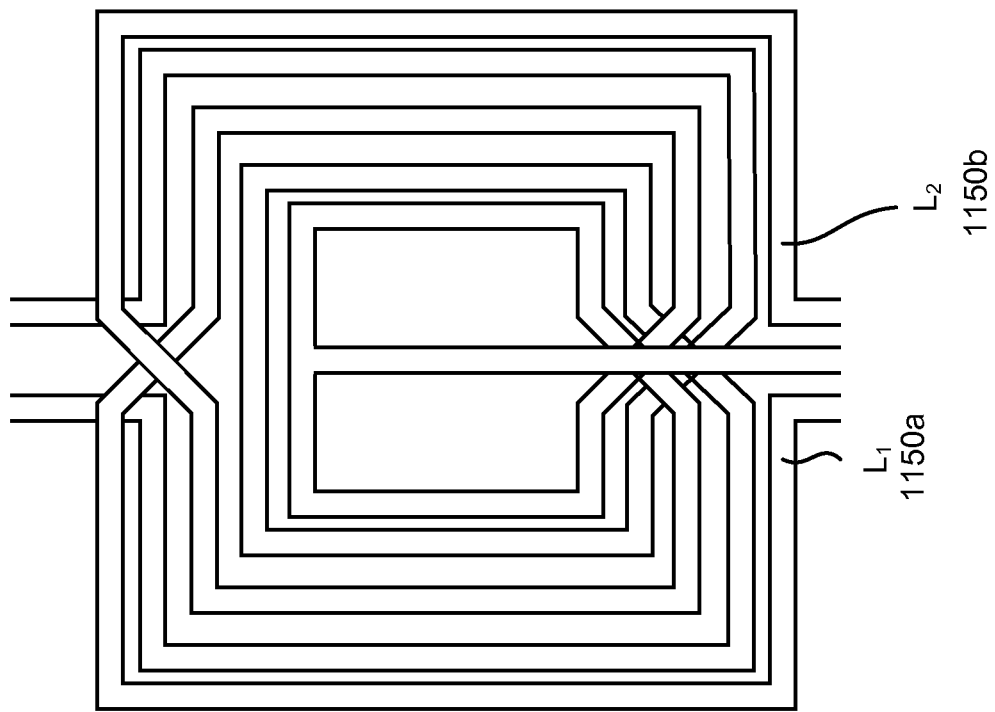
FIG. 11 is a layout diagram illustrating one configuration of a multi-port coupled transformer.

FIG. 11 is a layout diagram illustrating one configuration of a multi-port coupled transformer 1130. The multi-port coupled transformer 1130 may include a first primary inductor L1 1150a and a second primary inductor L1 1150b. In this implementation, the first primary inductor L1 1150a is equal in value to the second primary inductor L2 1150b. However, this is not necessarily the case for different configurations of multi-port coupled transformers 1130.

Figure 12:
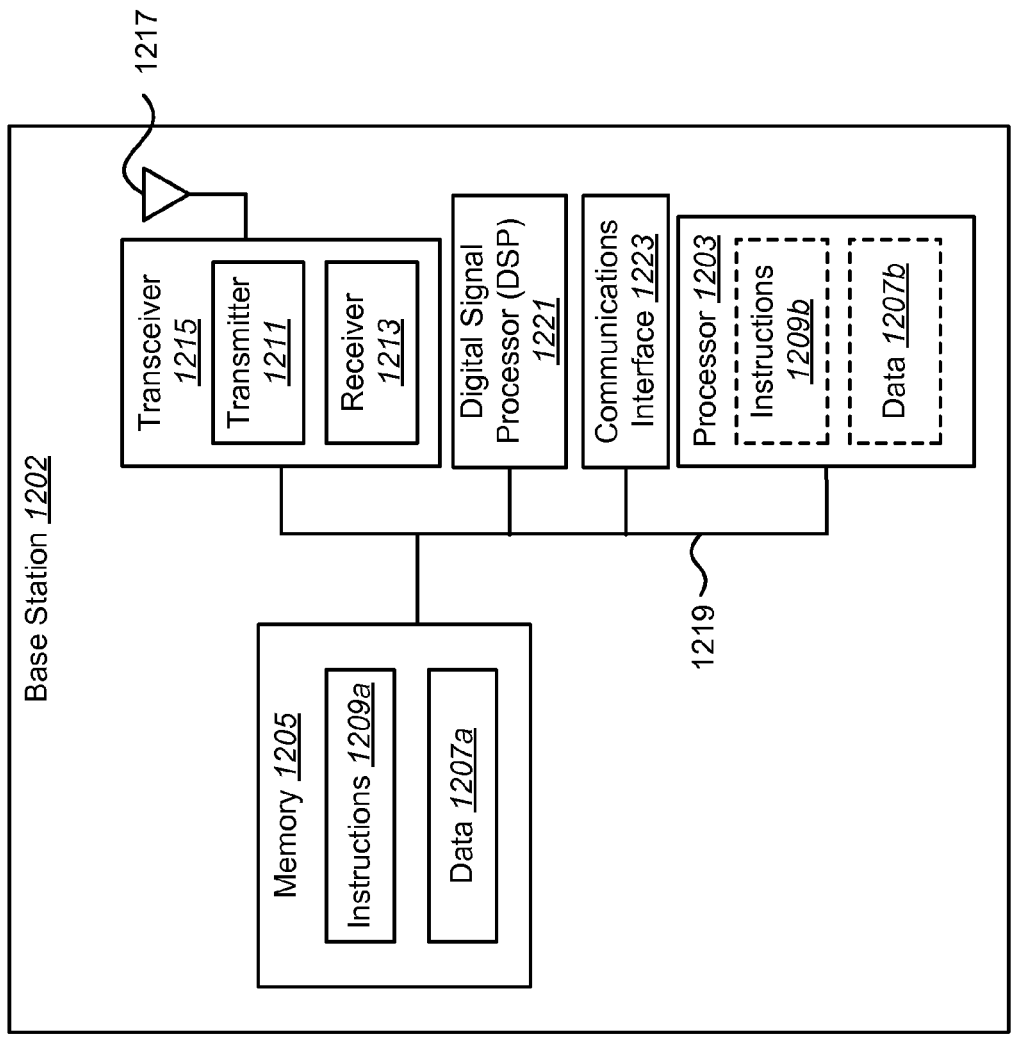
FIG. 12 illustrates certain components that may be included within a base station.

FIG. 12 illustrates certain components that may be included within a base station 1202. A base station 1202 may also be referred to as, and may include some or all of the functionality of, an access point, a broadcast transmitter, a node B, an evolved node B, etc. For example, the base station 1202 may be the wireless device 102 of FIG. 1. The base station 1202 may include a processor 1203. The processor 1203 may be a general purpose single- or multi-chip microprocessor (e.g., an ARM), a special purpose microprocessor (e.g., a digital signal processor (DSP)), a microcontroller, a programmable gate array, etc. The processor 1203 may be referred to as a central processing unit (CPU). Although just a single processor 1203 is shown in the base station 1202 of FIG. 12, in an alternative configuration, a combination of processors (e.g., an ARM and DSP) could be used.

The base station 1202 also includes memory 1205. The memory 1205 may be any electronic component capable of storing electronic information. The memory 1205 may be embodied as random access memory (RAM), read only memory (ROM), magnetic disk storage media, optical storage media, flash memory devices in RAM, on-board memory included with the processor, EPROM memory, EEPROM memory, registers and so forth, including combinations thereof.

Data 1207a and instructions 1209a may be stored in the memory 1205. The instructions 1209a may be executable by the processor 1203 to implement the methods disclosed herein. Executing the instructions 1209a may involve the use of the data 1207a that is stored in the memory 1205. When the processor 1203 executes the instructions 1209a, various portions of the instructions 1209b may be loaded onto the processor 1203, and various pieces of data 1207b may be loaded onto the processor 1203.

The base station 1202 may also include a transmitter 1211 and a receiver 1213 to allow transmission and reception of signals to and from the base station 1202. The transmitter 1211 and receiver 1213 may be collectively referred to as a transceiver 1215. The receiver 1213 of FIG. 12 may be one configuration of the receiver 104 illustrated in FIG. 1 and/or the receiver 204 illustrated in FIG. 2. An antenna 1217 may be electrically coupled to the transceiver 1215.

The base station 1202 may include a Digital Signal Processor (DSP) 1221. The base station 1202 may also include a communications interface 1223. The communications interface 1223 may allow a user to interact with the base station 1202.

The various components of the base station 1202 may be coupled together by one or more buses, which may include a power bus, a control signal bus, a status signal bus, a data bus, etc. For the sake of clarity, the various buses are illustrated in FIG. 12 as a bus system 1219.

Figure 13:
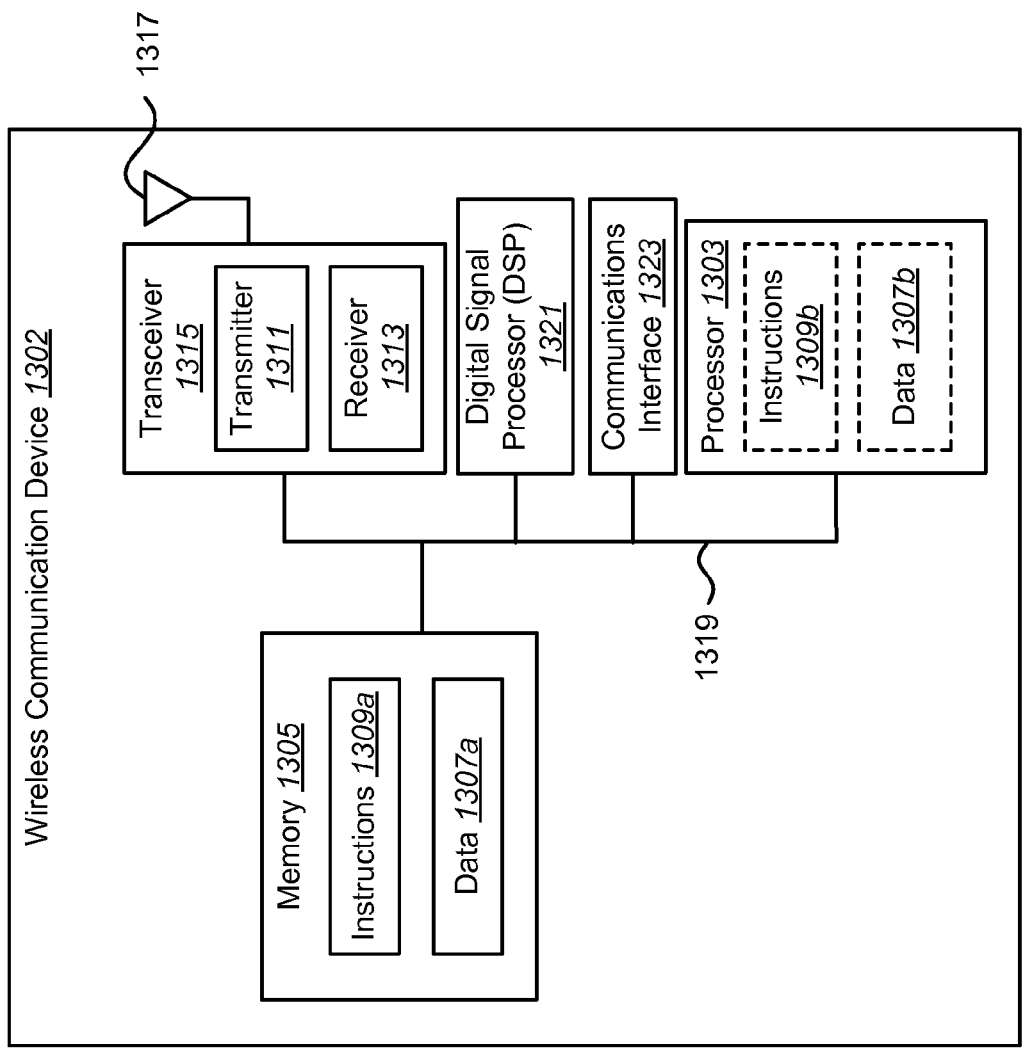
FIG. 13 illustrates certain components that may be included within a wireless communication device.

FIG. 13 illustrates certain components that may be included within a wireless communication device 1302. The wireless communication device 1302 may be an access terminal, a mobile station, a user equipment (UE), etc. For example, the wireless communication device 1302 may be the wireless device 102 of FIG. 1. Additionally or alternatively, the wireless communication device 1302 may include the receiver 104 illustrated in FIG. 1 and/or the receiver 204 illustrated in FIG. 2. The wireless communication device 1302 includes a processor 1303. The processor 1303 may be a general purpose single- or multi-chip microprocessor (e.g., an ARM), a special purpose microprocessor (e.g., a DSP), a microcontroller, a programmable gate array, etc. The processor 1303 may be referred to as a central processing unit (CPU). Although just a single processor 1303 is shown in the wireless communication device 1302 of FIG. 13, in an alternative configuration, a combination of processors (e.g., an ARM and DSP) could be used.

The wireless communication device 1302 also includes memory 1305. The memory 1305 may be any electronic component capable of storing electronic information. The memory 1305 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1307a and instructions 1309a may be stored in the memory 1305. The instructions 1309a may be executable by the processor 1303 to implement the methods disclosed herein. Executing the instructions 1309a may involve the use of the data 1307a that is stored in the memory 1305. When the processor 1303 executes the instructions 1309a, various portions of the instructions 1309b may be loaded onto the processor 1303, and various pieces of data 1307b may be loaded onto the processor 1303.

The wireless communication device 1302 may also include a transmitter 1311 and a receiver 1313 to allow transmission and reception of signals to and from the wireless communication device 1302. The transmitter 1311 and receiver 1313 may be collectively referred to as a transceiver 1315. An antenna 1317 may be electrically coupled to the transceiver 1315.

The wireless communication device 1302 may include a Digital Signal Processor (DSP) 1321. The wireless communication device 1302 may also include a communications interface 1323. The communications interface 1323 may allow a user to interact with the wireless communication device 1302.

The various components of the wireless communication device 1302 may be coupled together by one or more buses, which may include a power bus, a control signal bus, a status signal bus, a data bus, etc. For the sake of clarity, the various buses are illustrated in FIG. 13 as a bus system 1319.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A single-ended receiver for power supply rejection, comprising:
    a first low noise amplifier;
    a second low noise amplifier;
    a first balancing impedance coupled to the output of the first low noise amplifier via a first switch and to ground;
    a second balancing impedance coupled to the output of the second low noise amplifier via a second switch and to ground; and
    a multi-port coupled transformer that outputs a differential signal, the multi-port coupled transformer comprising:
        a first primary coil that is coupled to an output of the first low noise amplifier; and
        a second primary coil, wherein the first primary coil and the second primary coil are tightly coupled as a differential inductor.

2. The single-ended receiver of claim 1, wherein the second primary coil is coupled to an output of the second low noise amplifier.

3. The single-ended receiver of claim 1, wherein the first low noise amplifier receives a first input signal, and wherein the second low noise amplifier receives a second input signal.

4. The single-ended receiver of claim 3, wherein the first input signal is active and the second input signal is inactive, and wherein the multi-port coupled transformer outputs the differential signal based on the first input signal.

5. The single-ended receiver of claim 3, wherein the first input signal is inactive and the second input signal is active, and wherein the multi-port coupled transformer outputs the differential signal based on the second input signal.

6. The single-ended receiver of claim 3, wherein the first input signal is in a first frequency band and the second input signal is in a second frequency band.

7. The single-ended receiver of claim 1, wherein the first low noise amplifier is a high-band low noise amplifier, and wherein the second low noise amplifier is a low-band low noise amplifier.

8. The single-ended receiver of claim 1, wherein the multi-port coupled transformer further comprises a first secondary coil, wherein the first secondary coil is coupled between a first input of a first mixer and a second input of the first mixer, and wherein a first coupling occurs between the first primary coil and the first secondary coil.

9. The single-ended receiver of claim 8, wherein the first primary coil is coupled to the second primary coil, wherein the first mixer is a shared mixer, and wherein a second coupling occurs between the second primary coil and the first secondary coil.

10. The single-ended receiver of claim 9, wherein:
    an off impedance of the second low noise amplifier combined with the first balancing impedance equals an on impedance of the first low noise amplifier; and
    an off impedance of the first low noise amplifier combined with the second balancing impedance equals an on impedance of the second low noise amplifier.

11. The single-ended receiver of claim 8, further comprising:
- a first extended primary coil coupled to the first primary coil; and
- a second extended primary coil coupled to the second primary coil, wherein:
  - the first balancing impedance is coupled between the first extended primary coil and ground; and
  - the second balancing impedance is coupled between the second extended primary coil and ground.

12. The single-ended receiver of claim 11, wherein the multi-port coupled transformer further comprises a second secondary coil, and further comprising a second mixer, wherein the second secondary coil is coupled between a first input of the second mixer and a second input of the second mixer.

13. The single-ended receiver of claim 11, wherein the multi-port coupled transformer further comprises a second secondary coil, and wherein the second secondary coil is coupled between the first input of the first mixer and the second input of the first mixer.

14. The single-ended receiver of claim 8, further comprising:
- a third balancing impedance coupled to the output of the first low noise amplifier via a third switch and to ground; and
- a fourth balancing impedance coupled to the output of the second low noise amplifier via a fourth switch and to ground.

15. The single-ended receiver of claim 1, wherein an output of the first low noise amplifier is coupled to an output of the second low noise amplifier.

16. The single-ended receiver of claim 15, wherein the multi-port coupled transformer further comprises a first secondary coil, wherein the first secondary coil is coupled between a first input of a first mixer and a second input of the first mixer, wherein a first coupling occurs between the first primary coil and the first secondary coil, wherein a second coupling occurs between the second primary coil and the second secondary coil, and further comprising:
- a third balancing impedance coupled to the second primary coil via a third switch and to ground; and
- a fourth balancing impedance coupled to the second primary coil via a fourth switch and to ground.

17. The single-ended receiver of claim 1, wherein the second primary coil is coupled to an output of the second low noise amplifier, wherein the single-ended receiver further comprises a mixer, wherein a first input of the mixer is coupled to the output of the first low noise amplifier, and wherein a second input of the mixer is coupled to the output of the second low noise amplifier.

* * * * *